(12) United States Patent
Ito et al.

(10) Patent No.: US 11,755,072 B2
(45) Date of Patent: Sep. 12, 2023

(54) INFORMATION PROCESSING DEVICE AND CONTROL METHOD

(71) Applicant: Lenovo (Singapore) Pte. Ltd., Singapore (SG)

(72) Inventors: Yoshinori Ito, Kanagawa (JP); Tatsumi Nagasawa, Kanagawa (JP); Noritoshi Yoshiyama, Kanagawa (JP); Kyoko Kawamura, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/172,359

(22) Filed: Feb. 10, 2021

(65) Prior Publication Data
US 2022/0129037 A1 Apr. 28, 2022

(30) Foreign Application Priority Data
Oct. 26, 2020 (JP) .................................. 2020-179108

(51) Int. Cl.
*G06F 3/0482* (2013.01)
*G06F 1/16* (2006.01)
*G06F 3/0484* (2022.01)
*G06F 3/14* (2006.01)
*G09G 3/00* (2006.01)
*G06F 3/04842* (2022.01)
*G06T 11/00* (2006.01)

(52) U.S. Cl.
CPC .......... *G06F 1/1641* (2013.01); *G06F 1/1616* (2013.01); *G06F 1/1681* (2013.01); *G06F 3/04842* (2013.01); *G06F 3/1446* (2013.01); *G06T 11/00* (2013.01); *G09G 3/035* (2020.08); *G06T 2200/24* (2013.01); *G06T 2210/62* (2013.01)

(58) Field of Classification Search
CPC .. G06F 3/0482; G06F 3/0488; G06F 3/04817; G06F 3/04842; G06F 1/1647; G06F 1/1641; G06F 3/041; G06F 1/1616; G06F 3/0481; G06F 3/1431; G06F 3/1446; G06F 1/1681; G06F 1/1675; G09G 3/035; G09G 2380/02
See application file for complete search history.

(56) References Cited

U.S. PATENT DOCUMENTS 10,635,292 B2 * 4/2020 Aurongzeb .............. G09G 5/00
11,119,651 B2 * 9/2021 Liang .................... G06F 1/1649
(Continued)

FOREIGN PATENT DOCUMENTS

JP 2015-233198 A 12/2015
JP 2018-13850 A 1/2018

*Primary Examiner* — Dismery Mercedes
(74) *Attorney, Agent, or Firm* — Osha Bergman Watanabe & Burton LLP

(57) ABSTRACT

An information processing device that controls a display in two or more display areas, which do not overlap one another and include at least a first display area and a second display area, is provided. The information processing device includes: a display mode switching unit that switches between: a first display mode in which the display areas are controlled as one combined display area, and a second display mode in which the display is controlled as two display areas of at least the first display area and the second display area; and a display control unit.

9 Claims, 12 Drawing Sheets

(56) References Cited

U.S. PATENT DOCUMENTS

| | | | | |
|---|---|---|---|---|
| 2010/0095219 A1* | 4/2010 | Stachowiak | G06F 16/9562 | 715/745 |
| 2010/0107115 A1* | 4/2010 | Sareen | G06F 3/0483 | 715/783 |
| 2010/0182265 A1* | 7/2010 | Kim | G06F 1/1641 | 345/173 |
| 2011/0302529 A1* | 12/2011 | Yamamoto | G06F 3/04883 | 715/810 |
| 2012/0084690 A1* | 4/2012 | Sirpal | G06F 3/04886 | 715/835 |
| 2013/0321340 A1* | 12/2013 | Seo | G06F 3/04883 | 345/174 |
| 2014/0053097 A1* | 2/2014 | Shin | G06F 9/451 | 715/779 |
| 2014/0101578 A1* | 4/2014 | Kwak | G06F 3/017 | 715/761 |
| 2014/0149904 A1* | 5/2014 | Hiraishi | G06F 16/54 | 715/765 |
| 2014/0164966 A1* | 6/2014 | Kim | G06F 16/168 | 715/769 |
| 2014/0351748 A1* | 11/2014 | Xia | G06F 3/04847 | 715/798 |
| 2016/0196006 A1* | 7/2016 | Doan | G06F 3/0488 | 715/779 |
| 2017/0083212 A1* | 3/2017 | Lu | G06F 3/0481 | |
| 2019/0212915 A1* | 7/2019 | Kim | G06F 3/04883 | |
| 2020/0389550 A1* | 12/2020 | Yim | G06F 3/04817 | |
| 2021/0150953 A1* | 5/2021 | Lee | G09G 3/035 | |
| 2021/0405695 A1* | 12/2021 | Klein | G06F 3/04886 | |

* cited by examiner

INFORMATION PROCESSING DEVICE AND CONTROL METHOD

FIELD OF THE INVENTION

The present invention relates to an information processing device and a control method.

BACKGROUND

In recent years, there has been an information processing device having plural screens (for example, two screens). For example, an information processing device having a two-screen structure in which display units are mounted respectively on a first chassis and a second chassis rotatable through a coupling unit (hinge mechanism) is disclosed (for example, Japanese Unexamined Patent Application Publication No. 2015-233198).

Further, there is an information processing device in which a flexible display (display unit) such as an organic EL display is provided over a first chassis and a second chassis in a manner to be bendable according to the rotation between the first chassis and the second chassis (for example, see Japanese Unexamined Patent Application Publication No. 2018-13850). Even when one display unit is thus provided over the first chassis and the second chassis, the display unit can be split into a display area on the first chassis side and a display area on the second chassis side and used as a pseudo two-screen structure.

However, information processing devices usable in a multi-screen (for example, two-screen) structure as described above are desired not only to display information simply on each of the screens (display areas), but also to make more effective use of the plural screens (display areas).

SUMMARY

One or more embodiments of the present invention provide an information processing device and a control method to make more effective use of plural display areas.

According to one or more embodiments, a first aspect of the present invention provides an information processing device capable of controlling a display in two or more display areas, which do not overlap one another and include at least a first display area and a second display area, including: a display mode switching unit which switches between a first display mode, in which the display is controlled as one display area obtained by combining the two or more display areas, and a second display mode in which the display is controlled as two display areas of at least the first display area and the second display area; and a display control unit which, in response to switching from the first display mode to the second display mode, displays, in the first display area, an active window in the first display mode, and displays, in the second display area, a thumbnail image corresponding to an inactive window other than the active window in the first display mode.

The above information processing device may be configured to further include: a first chassis corresponding to the first display area; a second chassis corresponding to the second display area; a hinge unit which connects the first chassis and the second chassis to be rotatable relative to each other; and a state detection unit which detects whether the first chassis and the second chassis are in a bent state by relative rotation between the first chassis and the second chassis or not, wherein when a change from a state where the first chassis and the second chassis are not bent to the bent state is detected by the state detection unit, the display mode switching unit switches from the first display mode to the second display mode.

Further, the above information processing device may be configured to further include a display screen disposed across the first chassis and the second chassis to be bent according to the relative rotation between the first chassis and the second chassis, wherein the display screen has the first display area on the side of the first chassis and the second display area on the side of the second chassis.

The above information processing device may also be configured to include: a first display screen placed on the first chassis; and a second display screen placed on the second chassis, wherein the first display screen has the first display area and the second display screen has the second display area.

In the above information processing device, when there are plural inactive windows, the display control unit may display thumbnail images respectively corresponding to the plural inactive windows side by side in the second display area.

The above information processing device may be such that, when any one of the thumbnail images displayed in the second display area is selected, the display control unit displays an inactive window corresponding to the selected thumbnail image in the second display area as an active window.

The above information processing device may also be such that, when any one of the thumbnail images displayed in the second display area is selected, the display control unit hides the thumbnail image.

The above information processing device may further be such that the display control unit displays the inactive window corresponding to the selected thumbnail image in the whole of the second display area as the active window.

In the above information processing device, the display control unit may also display the thumbnail image in a semi-transparent display form.

Further, the second aspect of the present invention provides an information processing device capable of controlling a display in a plurality of display areas, which do not overlap one another and include at least a first display area and a second display area, including a display control unit which, when the first display area and the second display area are so disposed that a lower side of the first display area in a display orientation comes to an upper side of the second display area in the display orientation, displays, in the first display area, an active window among windows of running applications, and displays, in the second display area, a thumbnail image corresponding to an inactive window other than the active window.

The above information processing device may further include a display mode switching unit which switches between a first display mode, in which the display is controlled as one display area obtained by connecting the plurality of display areas, and a second display mode in which the display is controlled as the plurality of display areas obtained by splitting the display into at least the first display area and the second display area, wherein in response to switching from the first display mode to the second display mode, the display control unit displays, in the first display area, the active window in the first display mode, and displays, in the second display area, the thumbnail image corresponding to the inactive window in the first display mode.

The above information processing device may also be configured to further include: a first chassis corresponding to the first display area; a second chassis corresponding to the second display area; a hinge unit which connects the first chassis and the second chassis to be rotatable relative to each other; and a state detection unit which detects whether the first chassis and the second chassis are in a bent state by relative rotation between the first chassis and the second chassis or not, wherein when a change from a state where the first chassis and the second chassis are not bent to the bent state is detected by the state detection unit, the display mode switching unit switches from the first display mode to the second display mode.

In the above information processing device, the display mode switching unit may also switch between the first display mode and the second display mode based on a user's operation.

The third aspect of the present invention provides a control method for an information processing device capable of controlling a display in a plurality of display areas, which do not overlap one another and include at least a first display area and a second display area, including: a step of causing a display mode switching unit to switch between a first display mode, in which the display is controlled as one display area obtained by combining the plurality of display areas, and a second display mode in which the display is controlled as two display areas of at least the first display area and the second display area; and a step in which, in response to switching from the first display mode to the second display mode, a display control unit is caused to display, in the first display area, an active window in the first display mode, and display, in the second display area, a thumbnail image corresponding to an inactive window other than the active window in the first display mode.

The above control method may also be such that, the information processing device further includes: a first chassis corresponding to the first display area; a second chassis corresponding to the second display area; and a hinge unit which connects the first chassis and the second chassis to be rotatable relative to each other, and the control method further includes a step of causing a state detection unit to detect whether the first chassis and the second chassis are in a bent state by relative rotation between the first chassis and the second chassis or not, wherein in the step of causing the display mode switching unit to switch between the first display mode and the second display mode, when a change from a state where the first chassis and the second chassis are not bent to the bent state is detected by the state detection unit, the display mode switching unit switches from the first display mode to the second display mode.

The above-described aspects of the present invention can provide a display in two or more display areas more appropriately.

DETAILED DESCRIPTION

Embodiments of the present invention will be described below with reference to the accompanying drawings.

First Embodiment

First, an overview of a first embodiment of the present invention will be described.

Figure 1:
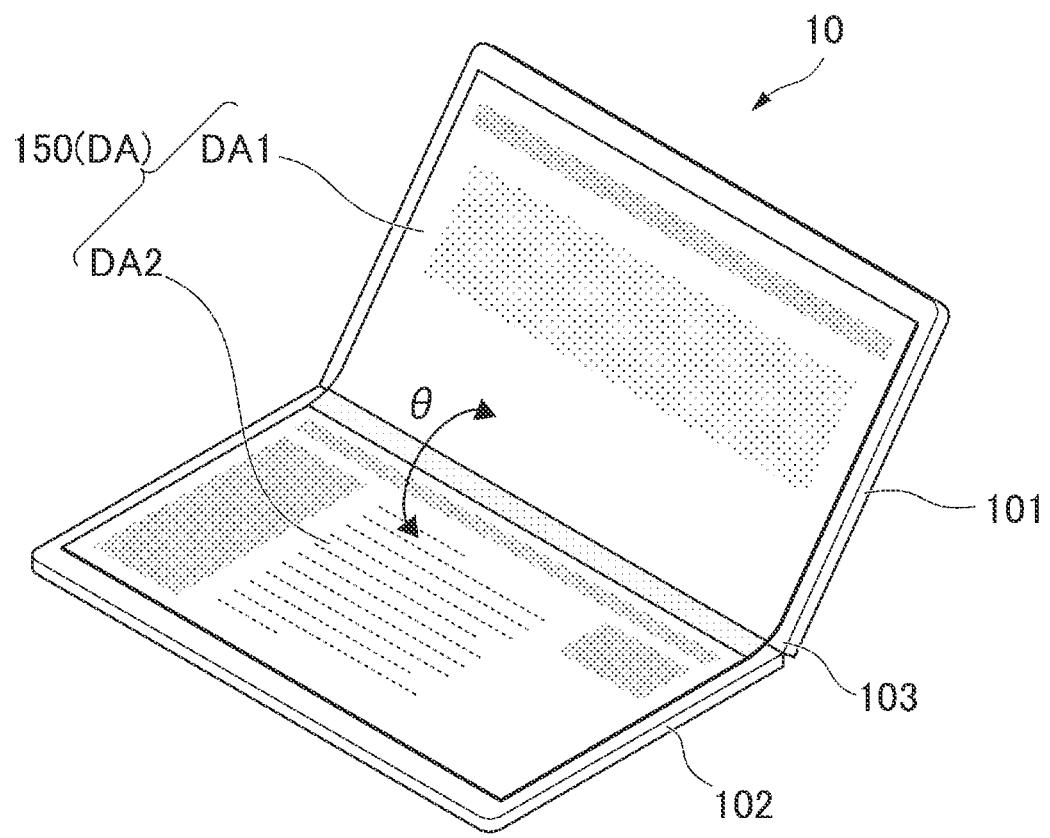
FIG. 1 is a perspective view illustrating the appearance of an information processing device according to a first embodiment.

FIG. 1 is a perspective view illustrating the appearance of an information processing device 10 according to the present embodiment. The information processing device 10 according to the present embodiment is a clamshell (laptop) PC (Personal Computer). The information processing device 10 includes a first chassis 101, a second chassis 102, and a hinge mechanism 103. The first chassis 101 and the second chassis 102 are chassis having a substantially rectangular plate shape (for example, a flat plate shape). One of the sides of the first chassis 101 and one of the sides of the second chassis 102 are joined (coupled) through the hinge mechanism 103 in such a manner that the first chassis 101 and the second chassis 102 are rotatable relative to each other around the axis of rotation of the hinge mechanism 103. A state where an open angle θ between the first chassis 101 and the second chassis 102 around the axis of rotation is substantially 0° is a state where the first chassis 101 and the second chassis 102 are closed in such a manner as to overlap each other. The state where the first chassis 101 and the second chassis 102 are closed is called a "closed state" (closed). Surfaces of the first chassis 101 and the second chassis 102 on the sides to face each other in the closed state are called "inner surfaces," and surfaces on the other sides of the inner surfaces are called "outer surfaces," respectively. The open angle θ can also be called an angle between the inner surface of the first chassis 101 and the inner surface of the second chassis 102. As opposed to the closed state, a state where the first chassis 101 and the second chassis 102 are open is called an "open state." The open state is a state where the first chassis 101 and the second chassis 102 are rotated relative to each other until the open angle θ exceeds a preset threshold value (for example, 10°).

Further, a display unit 150 is provided over the inner surface of the first chassis 101 and the inner surface of the second chassis 102. For example, the display unit 150 has a flexible display 151 (see FIG. 3 and FIG. 4) flexible according to the open angle θ by the relative rotation between the first chassis 101 and the second chassis 102. As the flexible display 151, an organic EL display or the like is used. The information processing device 10 can be used both in a one-screen structure using the entire display area DA (screen area) of the display unit 150 as one screen, and in a pseudo two-screen structure in which the display area DA of the display unit 150 is split into two display areas of a first display area DA1 and a second display area DA2, which do not overlap each other. Here, it is assumed that a display area corresponding to the inner surface side of the first chassis 101 in the display area DA of the display unit 150 is set as the first display area DA1 and a display area corresponding to the inner surface side of the second chassis 102 is set as the second display area DA2.

Note that a touch sensor is provided on the display area DA of the display unit 150 to be able to detect touch operations to the first display area DA1 and the second display area DA2. By putting the information processing device 10 into the open state, a user can visually confirm the display of the display unit 150 provided on the respective inner surfaces of the first chassis 101 and the second chassis 102 and perform touch operations to the display unit 150, thus enabling use of the information processing device 10.

Further, when the information processing device 10 makes a transition from a display of the one-screen structure to a display of the two-screen structure, an active window is displayed on a primary screen of the two screens, and a thumbnail image(s) of an inactive window(s) is displayed on a secondary screen. In the following, an operating mode for the display in the one-screen structure is called a "one-screen mode," and an operating mode for the display in the two-screen structure is called a "two-screen mode." The active window is a window being currently selected as an operation target and used by the user, that is, a window being displayed in the foreground. The active window to be displayed on the primary screen is a window displayed as the active window in the one-screen mode immediately before the transition to the two-screen mode. On the other hand, the inactive window is any window other than the active window in the one-screen mode immediately before the transition to the two-screen mode. In the following, such a display that the active window is displayed on the primary screen and a thumbnail image of the inactive window is displayed on the secondary screen is called a "thumbnail window display."

Figure 2:
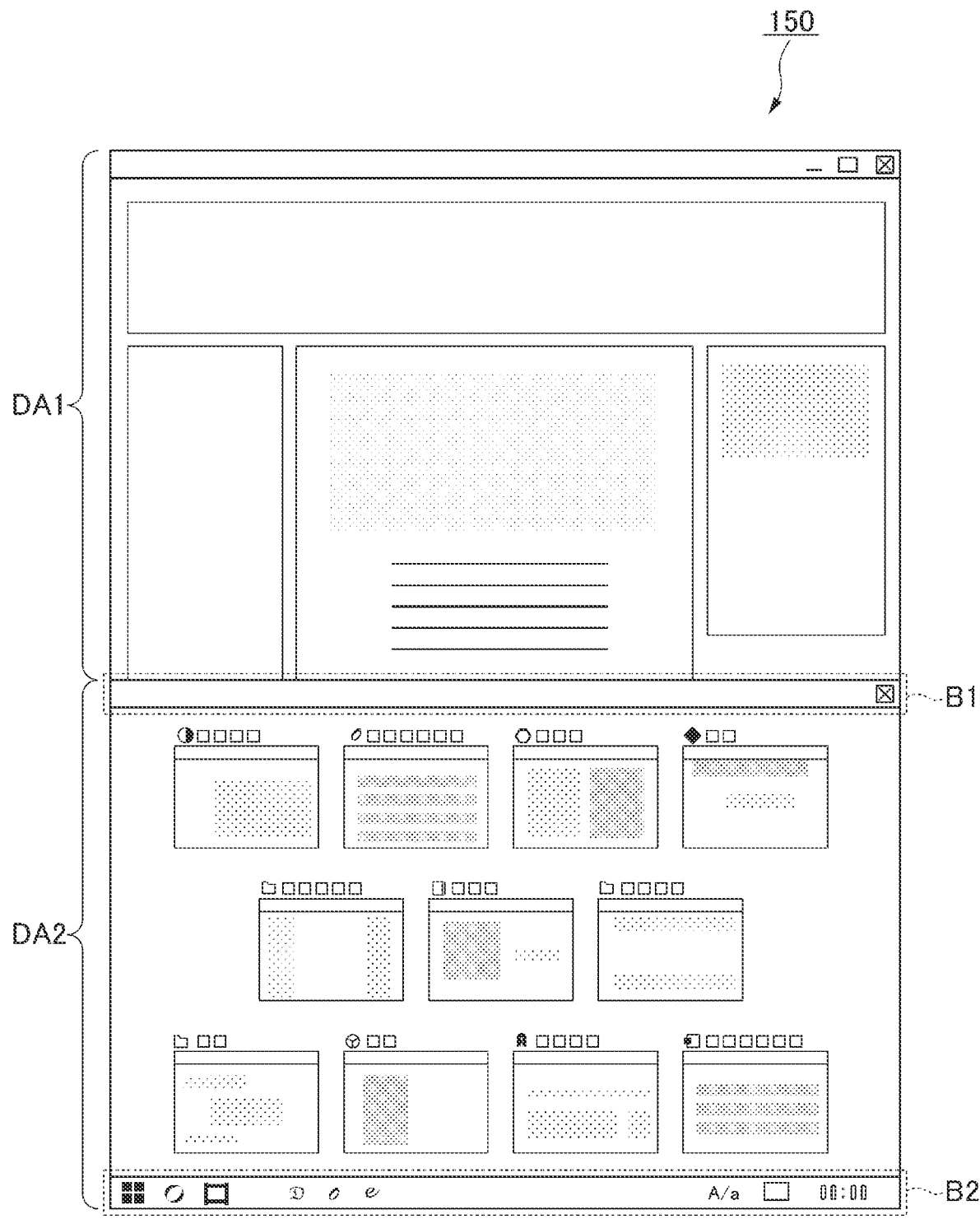
FIG. 2 is a diagram illustrating an example of a thumbnail window display according to the first embodiment.

FIG. 2 is a diagram illustrating an example of the thumbnail window display according to the present embodiment. This figure illustrates an example of the thumbnail window display provided on the display unit 150 when the information processing device 10 illustrated in FIG. 1 makes a transition from the one-screen mode to the two-screen mode. In a usage form of a clamshell PC in a typical two-screen mode, the first display area DA1 and the second display area DA2 are lined up and down vertically in landscape orientation. The landscape orientation of the display areas means an orientation where the long sides of the four sides of each rectangular display area are in a lateral direction and the short sides are in a longitudinal direction. The longitudinal direction corresponds to the vertical (up and down) direction, and the lateral direction corresponds to the horizontal (right and left) direction. The vertical direction is typically a perpendicular direction. In other words, the first display area DA1 and the second display area DA2 are so arranged that a lower-side edge in the display orientation of the first display area DA1 comes to the side of an upper-side edge in the display orientation of the second display area DA2. Here, the first display area DA1 corresponds to the primary screen and the second display area DA2 corresponds to the secondary screen. However, it is also possible to set the second display area DA2 as the primary screen and the first display area DA1 as the secondary screen. Further, it is possible to switch the selection as to which area is set to the primary screen based on a device state obtained from user operations or values read from various sensors, a usage history, and the like. For example, a UI (User Interface) to switch between the primary screen and the secondary screen of the information processing device 10 may be displayed in either one or both of the first display area DA1 and the second display area DA2 to switch between the primary screen and the secondary screen according to a user operation to the UI.

Upon transition from the one-screen mode to the two-screen mode, the information processing device 10 adapts a window of an application (hereinafter simply called an "app") running in the one-screen mode to a window of the first display area DA1 (primary screen). At this time, the information processing device 10 displays a window as an active window in the one-screen mode in the foreground as the active window over the entire display area of the first display area DA1 (full-screen display). Further, the information processing device 10 adapts a window as an inactive window in the one-screen mode to a layer behind the foreground in which the active window is displayed in the first display area DA1 in such a state as to maintain a layer relationship (the stacking order of windows) in the one-screen mode. Thus, the full-screen display of the active window is provided in the first display area DA1, and the inactive window is not displayed (cannot be viewed by the user) though it exists in a layer behind the active window.

On the other hand, the information processing device 10 generates a thumbnail image of the window as the inactive window in the one-screen mode, and displays the thumbnail image in the second display area DA2. When there are two or more inactive windows, the information processing device 10 displays thumbnail images of the two or more inactive windows side by side in the second display area DA2. Then, when any one of the thumbnail images is selected with a user's operation (for example, a tap operation), the information processing device 10 closes (hides) all the thumbnail images displayed in the second display area DA2, and displays an inactive window corresponding to the selected thumbnail image in the second display area DA2 as an active window. For example, the information processing device 10 provides, on the entire second display area DA2, a full-screen display of the inactive window corresponding to the selected thumbnail image as an active window. Specifically, the information processing device 10 moves the inactive window corresponding to the selected thumbnail image from the first display area DA1 to the second display area DA2, and provides the full-screen display of the inactive window as the active window.

The two or more thumbnail images are displayed in the second display area DA2 (secondary screen) as one thumbnail window. A title bar B1 is displayed on the upper edge of the thumbnail window. A close button "x" at the right end of the title bar B1 is displayed as an operator used to close the thumbnail window. The user can also close (hide) all the thumbnail images by operating the close button "x" on this title bar B1 (for example, with a tap operation).

Note that inactive windows existing in layers behind the active window in the first display area DA1 (that is, real forms of inactive windows (real windows) displayed as thumbnails in the second display area DA2) may be stacked one above the other according to the priority in the same size as the active window in a manner to be hidden behind the active window, or may be stacked one above the other according to the priority in a size smaller than the active window. Further, all inactive windows existing in layers behind the active window in the first display area DA1 (that is, real forms of inactive windows (real windows) displayed as thumbnails in the second display area DA2) may be once miniaturized (for example, in a state where only icons exist on a task bar on Windows (registered trademark)), or when the thumbnail window is not displayed as a semi-transparent (see-through) display, it does not matter if the inactive windows are stacked behind the active window. In short, it is only necessary to process the real forms of the inactive windows (real windows) displayed as thumbnails in the second display area DA2 in a manner not to be viewed temporarily by the user. After that, only a window of an app selected in the thumbnail window is displayed on the top in the second display area DA2.

Further, a task bar B2 displayed on the lower edge of the second display area DA2 is displayed in one place as a task bar common to the first display area DA1 and the second display area DA2. Note that the position of displaying the task bar B2 may also be the left edge or the right edge of the first display area DA1 or the second display area DA2, or the upper edge of the first display area DA1. Further, task bars may be displayed in both the first display area DA1 and the second display area DA2, respectively. The application of the present invention is not limited by the position where the task bar is displayed.

Thus, upon transition from the one-screen mode to the two-screen mode, the information processing device 10 can not only use a running app being displayed in the active window continuously in the first display area DA1, but also check any other running app in the second display area DA2, so it is convenient to use. Further, the information processing device displays, in the second display area DA2, a window corresponding to a thumbnail image selected by the user from among the thumbnail images displayed in the second display area DA2 to enable the use of an app of the window, so it is convenient to use. Thus, the information processing device 10 can make effective use of the two or more display areas.

Next, usage forms and screen modes of the information processing device 10 will be described in detail. First, the usage forms of the information processing device 10 are divided into a state in which the first chassis 101 and the second chassis 102 are bent (Bent form) at an open angle θ between the first chassis 101 and the second chassis 102, and a flat state (Flat form) in which the first chassis 101 and the second chassis 102 are not bent.

Figure 3:
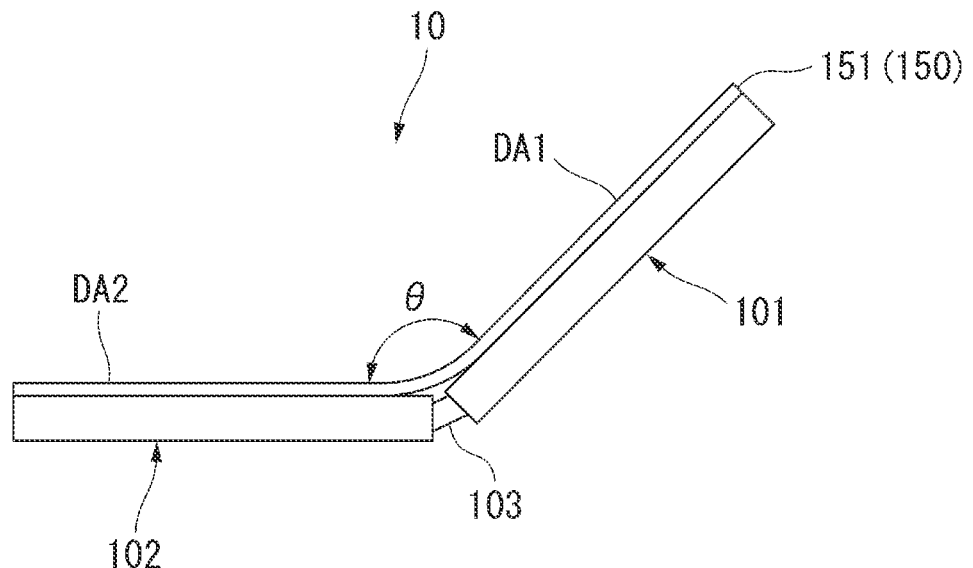
FIG. 3 is a side view illustrating an example of the information processing device in a bent state according to the first embodiment.

FIG. 3 is a side view illustrating an example of the information processing device 10 in the bent state (Bent form). The flexible display 151 of the display unit 150 is disposed across the first chassis 101 and the second chassis 102. In the display areas of the display unit 150 (flexible display 151), the first display area DA1 is a display area on the side of the first chassis 101, and the second display area DA2 is a display area on the side of the second chassis 102. The flexible display 151 is bent according to the rotation (open angle θ) between the first chassis 101 and the second chassis 102. The information processing device 10 determines the state of being bent (Bent form) according to the open angle θ. As an example, in the case of 10°<θ<170°, the information processing device 10 determines the bent state (Bent form). This state corresponds to a usage form as a so-called clamshell mode or book mode.

Figure 4:
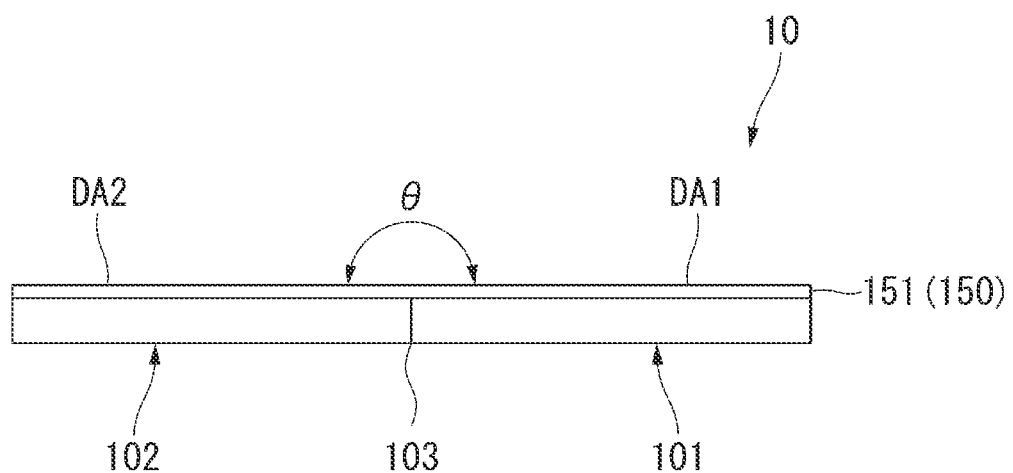
FIG. 4 is a side view illustrating the information processing device in a flat state according to the first embodiment.

FIG. 4 is a side view illustrating an example of the information processing device 10 in the flat state (Flat form). The information processing device 10 typically determines the flat state (Flat form) when the open angle θ is 180°, but as an example, the information processing device 10 may also determine the flat state (Flat form) in the case of 170°≤θ≤180°. For example, when the open angle θ between the first chassis 101 and the second chassis 102 is 180°, the flexible display 151 of the display unit 150 is also in the flat state. This state corresponds to a usage form as a so-called tablet mode.

Figure 5:
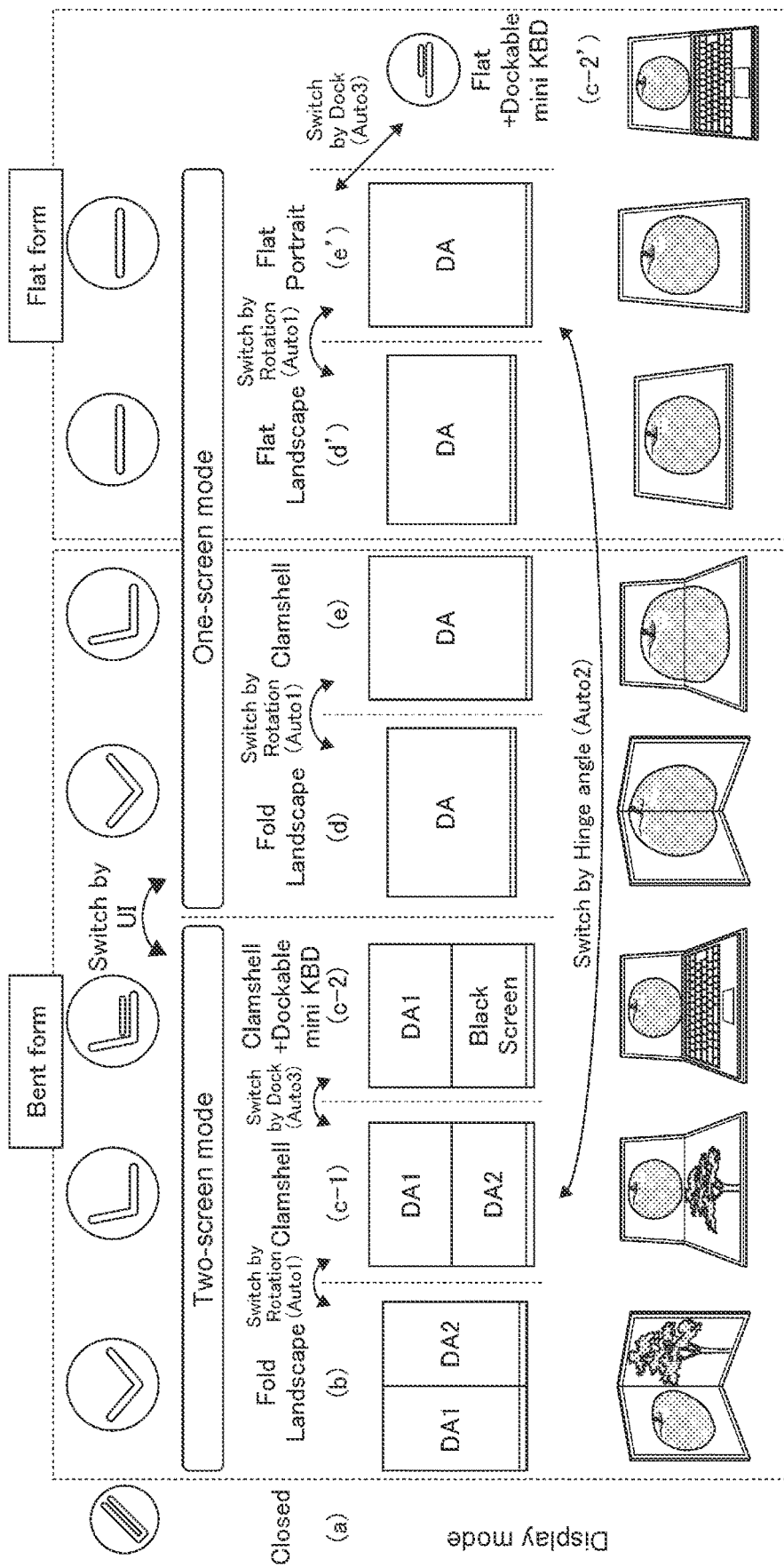
FIG. 5 is a diagram illustrating specific examples of various display modes of the information processing device according to the first embodiment.

Referring next to FIG. 5, display modes in various usage forms of the information processing device 10 will be described in detail.

FIG. 5 is a diagram illustrating specific examples of various display modes of the information processing device 10 according to the present embodiment. The display mode of the information processing device 10 varies depending on the usage form classified by the open angle θ between the first chassis 101 and the second chassis 102, the posture (orientation) of the information processing device 10, whether the display mode is the one-screen mode or the two-screen mode, and the like. Note that one screen is also called a single screen, and two screens are also called split screens or dual screens.

Display mode (a) is a display mode when the first chassis 101 and the second chassis 102 are in the closed state (Closed) as the usage form. For example, in this closed state, the information processing device 10 is in a standby state, such as a sleep state or a hibernation state, and the display unit 150 is in a display-off state.

Display mode (b) is a display mode when the first chassis 101 and the second chassis 102 are in the bent state (Bent form) as the usage form, and the display mode is the two-screen mode in which the display is so controlled that the display area of the display unit 150 is split into two display areas of the first display area DA1 and the second display area DA2. Further, the orientation of the information processing device 10 is an orientation in which the first display area DA1 and the second display area DA2 are lined up side by side in portrait orientation. The portrait orientation of the display areas means an orientation in which long sides of the four sides of each of the rectangular display areas are vertical and short sides are horizontal. This usage form corresponds to a so-called book mode in which right and left pages when a book is opened correspond to right and left screens. Since this display mode is in the bent state (Bent form) in such a manner that the first display area DA1 and the second display area DA2 are lined up side by side and the two combined display areas are horizontally long, it is also called "Fold Landscape." In this display mode (b), for example, the information processing device 10 is in such a two-screen display mode that the first display area DA1 on the left side is set as the primary screen and the second display area DA2 on the right side is set as the secondary screen in normal operating conditions.

Note that the correspondences of the first display area DA1 and the second display area DA2 to the primary screen and the secondary screen in the display mode (b) may be reversed.

Like the display mode (b), display mode (c-1) is a display mode when the first chassis 101 and the second chassis 102 are in the bent state (Bent form), and the display mode is the two-screen mode in which the display is so controlled that the display area of the display unit 150 is split into two display areas of the first display area DA1 and the second display area DA2, but the orientation of the information processing device 10 as the usage form is different. The orientation of the information processing device 10 is an orientation in which the first display area DA1 and the second display area DA2 are lined up and down in landscape orientation. The landscape orientation of the display areas means an orientation in which long sides of the four sides of each of the rectangular display areas are horizontal and short sides are vertical. This usage form is one of general usage forms of a clamshell PC. In this display mode (c-1), for example, the information processing device 10 is in such a two-screen display mode that the first display area DA1 is set as the primary screen and the second display area DA2 is set as the secondary screen in normal operating conditions.

Note that the correspondences of the first display area DA1 and the second display area DA2 to the primary screen and the secondary screen in the display mode (c-1) may be reversed.

The information processing device 10 detects a change in the posture (orientation) of the information processing device 10 to automatically switch from the display mode (b) to the display mode (c-1) or from the display mode (c-1) to the display mode (b) (Switch by Rotation).

Like the display mode (c-1), display mode (c-2) is a display mode in the bent state (Bent form) and the two-screen mode, and the orientation of the information processing device is the same but different in that an external physical keyboard is connected. This usage form is in such a state that the keyboard is connected in the general usage form of the clamshell PC. For example, the external keyboard (Dockable mini KBD (KeyBorD)) connectable to the information processing device 10 is substantially equivalent in size to the second display area DA2 and placed on the second display area DA2 to realize a usage form similar to that of a traditional clamshell PC equipped originally with a physical keyboard. The information processing device 10 and the external keyboard are connected, for example, through Bluetooth (registered trademark). In this display mode (c-2), for example, the information processing device 10 is in such a two-screen display mode that the first display area DA1 is set as the primary screen and the second display area DA2 is set as the secondary screen in normal operating conditions. However, since the second display area DA2 becomes invisible by the keyboard, a black display is provided or the display is turned off. Therefore, the display mode (c-2) is virtually the one-screen display mode.

When detecting the connection with the external keyboard in the state of the display mode (c-1), the information processing device 10 automatically switches from the display mode (c-1) to the display mode (c-2) (Switch by Dock).

Like the display mode (b), display mode (d) is in the bent state (Bent form) in which the first chassis 101 and the second chassis 102 are bent, and the orientation of the information processing device 10 is the same but different in that the display mode is the one-screen mode in which the display is so controlled that the first display area DA1 and the second display area DA2 are combined as one display area DA of the display unit 150. Although this usage form is the one-screen mode different from the display mode (b), since it is the bent state (Bent form) and the display area DA is horizontally long, it is also called "Fold Landscape." In this display mode (d), for example, the information processing device 10 is in such a one-screen display mode that the display area DA is set as the primary screen corresponding to the first display area DA1 in the two-screen mode in normal operating conditions.

Here, the two-screen mode and the one-screen mode are switched, for example, with a user's operation. For example, the information processing device 10 displays, on the task bar, an operation icon (hereinafter called a "screen mode switching icon") as a UI (User Interface) to switch between the two-screen mode and the one-screen mode. This screen mode switching icon functions as a toggle switch which switches alternately between the two-screen mode and the one-screen mode each time it is operated. Then, when detecting an operation on the screen mode switching icon in the state of the display mode (b), the information processing device 10 switches from the display mode (b) to the display mode (d) (Switch by UI).

Note that the UI to switch between the two-screen mode and the one-screen mode is not limited to the icon displayed on the task bar, and any UI can be used. For example, the UI to switch between the two-screen mode and the one-screen mode may be an icon displayed on a tool bar. Further, the information processing device 10 may display a dialog screen on which switching between the two-screen mode and the one-screen mode can be set, and control the display mode to a screen mode set with a user's operation on the dialog screen.

Like the display mode (c-1), display mode (e) is in the bent state (Bent form) in which the first chassis 101 and the second chassis 102 are bent, and the orientation of the information processing device 10 is the same but different in that the display mode is the one-screen mode in which the display is so controlled that the first display area DA1 and the second display area DA2 are combined as one display area DA of the display unit 150. Although this usage form is the one-screen mode different from the display mode (c-1), it is one of general usage forms of the clamshell PC. In this display mode (e), for example, the information processing device 10 is in such a one-screen display mode that the display area DA is set as the primary screen corresponding to the first display area DA1 in the two-screen mode in normal operating conditions.

The information processing device 10 automatically switches from the display mode (b) to the display mode (c-1) or from the display mode (c-1) to the display mode (b) by detecting a change in the posture (orientation) of the information processing device 10 (Switch by Rotation).

Like the display mode (d), display mode (d') is in the one-screen mode and the orientation of the information processing device 10 is such an orientation that the display area DA is horizontally long, but different in that the information processing device 10 is in the flat state (Flat form) in which the first chassis 101 and the second chassis 102 are not bent. The flat state (Flat form) is a state in which the open angle θ between the first chassis 101 and the second chassis 102 is substantially 180°. This usage form corresponds to the so-called tablet mode described with reference to FIG. 4. Since this usage form is in the flat state (Flat form) and the display area DA is horizontally long, it is also called "Flat Landscape." This display mode (d') differs from the display mode (d) only in the open angle θ between the first chassis 101 and the second chassis 102. Like in the display mode (d), for example, the information processing device 10 in the display mode (d') is in such a one-screen display mode that the display area DA is set as the primary screen corresponding to the first display area DA1 in the two-screen mode in normal operating conditions.

Like the display mode (e), display mode (e') is in the one-screen mode and the orientation of the information processing device 10 is such an orientation that the display area DA is vertically long, but different in that the information processing device 10 is in the flat state (Flat form) in which the first chassis 101 and the second chassis 102 are not bent. Since this usage form is in the flat state (Flat form) and the display area DA is vertically long, it is also called "Flat Portrait." This display mode (e') differs from the display mode (e) only in the open angle θ between the first chassis 101 and the second chassis 102. Like in the display mode (e), for example, the information processing device 10 in the display mode (e') is in such a one-screen display mode that the display area DA is set as the primary screen corresponding to the first display area DA1 in the two-screen mode in normal operating conditions.

The information processing device 10 automatically switches from the display mode (d') to the display mode (e') or from the display mode (e') to the display mode (d') by detecting a change in the posture (orientation) of the information processing device 10 (Switch by Rotation).

Further, when detecting the connection with the external keyboard in the state of the display mode (e'), the information processing device 10 automatically switches from the display mode (e') to display mode (c-2') (Switch by Dock). The display mode (c-2') differs from the display mode (c-2) only in the open angle θ between the first chassis 101 and the second chassis 102. In the display mode (c-2'), for example, the information processing device 10 is in such a two-screen display mode that the first display area DA1 is set as the primary screen and the second display area DA2 is set as the secondary screen in normal operating conditions. However, since the second display area DA2 becomes invisible by the keyboard, black display is provided or the display is turned off. Therefore, the display mode (c-2') is virtually the one-screen display mode.

Further, when detecting a change from the flat state (Flat form) in which the first chassis 101 and the second chassis 102 are not bent to the bent state (Bent form), the information processing device 10 switches from the one-screen mode to the two-screen mode. For example, when detecting a change to the bent state (Bent form) in the state of the display mode (d') based on the open angle θ between the first chassis 101 and the second chassis 102, the information processing device 10 automatically switches from the display mode (d') to the display mode (b). Further, when detecting a change to the bent state (Bent form) in the state of the display mode (e') based on the open angle θ between the first chassis 101 and the second chassis 102, the information processing device 10 automatically switches from the display mode (e') to the display mode (c-1).

Note that, for example, in the display modes (b), (c-1), (c-2), (d), (e), (d'), (e'), and (c-2'), the task bar (the task bar B2 illustrated in FIG. 2) is displayed only in one place inside the display area of the display unit 150 (for example, on the bottom of the display area) regardless of whether the display mode is the one-screen mode or the two-screen mode.

(Configuration of Information Processing Device 10)

A specific configuration of the information processing device 10 will be described below.

Figure 6:
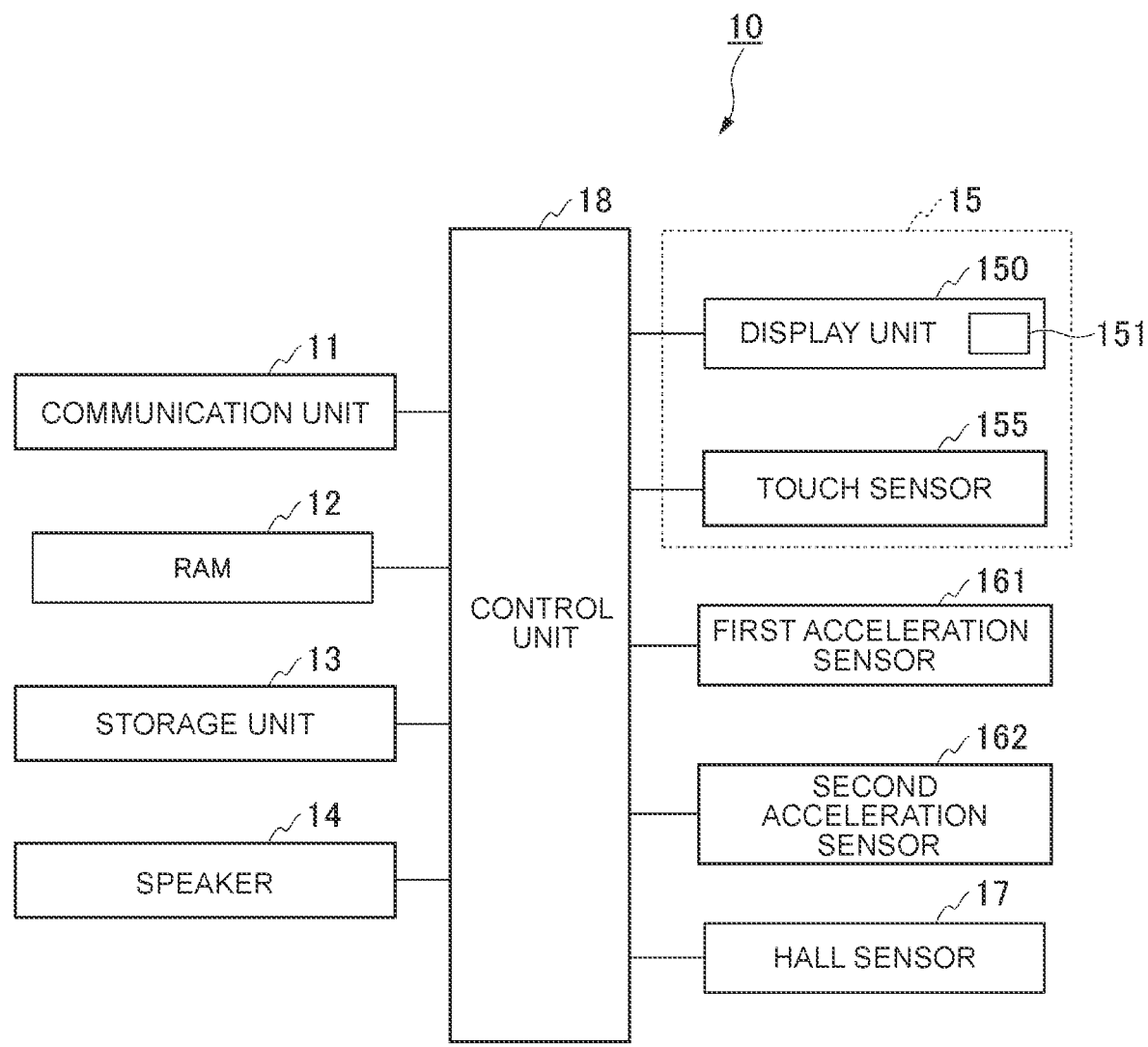
FIG. 6 is a block diagram illustrating a hardware configuration example of the information processing device according to the first embodiment.

FIG. 6 is a block diagram illustrating an example of the hardware configuration of the information processing device 10 according to the present embodiment. The information processing device 10 includes a communication unit 11, a RAM (Random Access Memory) 12, a storage unit 13, a speaker 14, a touch screen 15, a first acceleration sensor 161, a second acceleration sensor 162, a Hall sensor 17, and a control unit 18. These units are connected communicably to one another through a bus or the like.

The communication unit 11 is, for example, configured to include digital input/output ports such as two or more Ethernet (registered trademark) ports and two or more USB (Universal Serial Bus) ports, communication devices for performing wireless communication such as Bluetooth (registered trademark) and Wi-Fi (registered trademark), and the like. For example, the communication unit 11 is connected with the external keyboard described above and the like by using Bluetooth (registered trademark).

In the RAM 12, programs and data for processing executed by the control unit 18 are expanded, and various data are saved or deleted as appropriate. For example, the RAM 12 functions also as a video memory (V-RAM) for the display of the display unit 150. As an example, the RAM 12 functions as a video memory for data displayed in the display area DA when the display unit 150 is controlled in the one-screen mode. Further, the RAM 12 functions as a video memory for data displayed in the first display area DA1 and the second display area DA2 when the display unit 150 is controlled in the two-screen mode. Further, association information indicating in which of the first display area DA1 and the second display area DA2 the window of each app executed in the two-screen mode is displayed, and the like are stored in the RAM 12. Note that, since the RAM 12 is a volatile memory, no data is held after the supply of power is stopped.

The storage unit 13 is configured to include an SSD (Solid State Drive), an HDD (Hard Disk Drive), a flash-ROM (Read Only Memory), and the like. For example, in the storage unit 13, a BIOS (Basic Input Output System) program and setting data, an OS (Operating System) and app programs running on the OS, various data used in the apps, and the like are stored.

The speaker 14 outputs electronic sound, voice, and the like.

The touch screen 15 includes the display unit 150 and a touch sensor 155. As described above, the display unit 150 has the flexible display 151 flexible according to the open angle θ by the relative rotation between the first chassis 101 and the second chassis 102. Under the control of the control unit 18, the display unit 150 provides a display corresponding to each display mode described with reference to FIG. 5. The touch sensor 155 is provided on the screen of the display unit 150 to detect a touch operation on the screen. For example, in the one-screen mode, the touch sensor 155 detects a touch operation in the display area DA. Further, in the two-screen mode, the touch sensor 155 detects a touch operation(s) in either or both of the first display area DA1 and the second display area DA2. The touch operations include a tap operation, a slide operation, a flick operation, a swipe operation, a pinch operation, and the like. The touch sensor 155 detects a touch operation and outputs, to the control unit 18, operation information based on the detected operation.

The first acceleration sensor 161 is provided inside the first chassis 101 to detect the orientation of the first chassis 101 and a change in orientation. For example, when a direction parallel to the long-side direction of the first display area DA1 is set as an X1 direction, a direction parallel to the short-side direction of the first display area DA1 is set as a Y1 direction, and a direction perpendicular to the X1 direction and the Y1 direction is set as a Z1 direction, the first acceleration sensor 161 detects acceleration in the X1 direction, the Y1 direction, and the Z1 direction, respectively, and outputs the detection results to the control unit 18.

The second acceleration sensor 162 is provided inside the second chassis 102 to detect the orientation of the second chassis 102 and a change in orientation. For example, when a direction parallel to the long-side direction of the second display area DA2 is set as an X2 direction, a direction parallel to the short-side direction of the second display area DA2 is set as a Y2 direction, and a direction perpendicular to the X2 direction and the Y2 direction is set as a Z2 direction, the second acceleration sensor 162 detects acceleration in the X2 direction, the Y2 direction, and the Z2 direction, respectively, and outputs the detection results to the control unit 18.

The control unit 18 can detect the posture (orientation) of the information processing device 10 and the open angle θ between the first chassis 101 and the second chassis 102 based on the detection results of the first acceleration sensor 161 and the second acceleration sensor 162. Note that any other kind of sensor may also be used to detect the open angle θ.

The Hall sensor 17 is configured to include a Hall element and a magnet. The Hall element is provided inside either the first chassis 101 or the second chassis 102, and the magnet is provided inside the other chassis. For example, the Hall element and the magnet are provided inside the first chassis 101 and the second chassis 102 in corresponding positions, respectively. More specifically, the Hall element and the magnet are provided in positions to face each other in the closed state. The magnetic field detected by the Hall element varies between the open state and the closed state of the first chassis 101 and the second chassis 102. The Hall sensor 17 is such that the Hall element arranged inside the first chassis 101 detects the magnetic field generated from the magnet arranged inside the second chassis 102 to output the detection result to the control unit 18. Based on the detection result of this Hall sensor 17, the control unit 18 can detect whether the information processing device 10 is in the open state or the closed state.

Note that the control unit 18 can also use a Hall sensor provided separately from the Hall sensor 17 to detect the connection of an external keyboard (Dockable mini KBD: KeyBorD) connectable to the information processing device 10 in order to detect the connection with the external keyboard (mini-KBD). For example, a magnet is provided on the side of the external keyboard (mini-KBD) and a Hall element is provided on the side of a corresponding chassis (for example, the second chassis 102). In this case, the magnetic field detected by the Hall element varies depending on whether the external keyboard (mini-KBD) is placed on a display area on the side of the second chassis 102 or not. The control unit 18 may detect the connection of the external keyboard (mini-KBD) based on the detection result of this Hall sensor.

The control unit 18 is configured to include a CPU (Central Processing Unit), a GPU (Graphic Processing Unit), a microcomputer (Microcomputer), and the like. The control unit centrally controls the operation of the information processing device 10 to implement various functions by executing processing of the BIOS, the OS, and programs such as apps running on the OS.

Here, a functional configuration related to display control processing among pieces of processing executed by the control unit 18 will be described.

Figure 7:
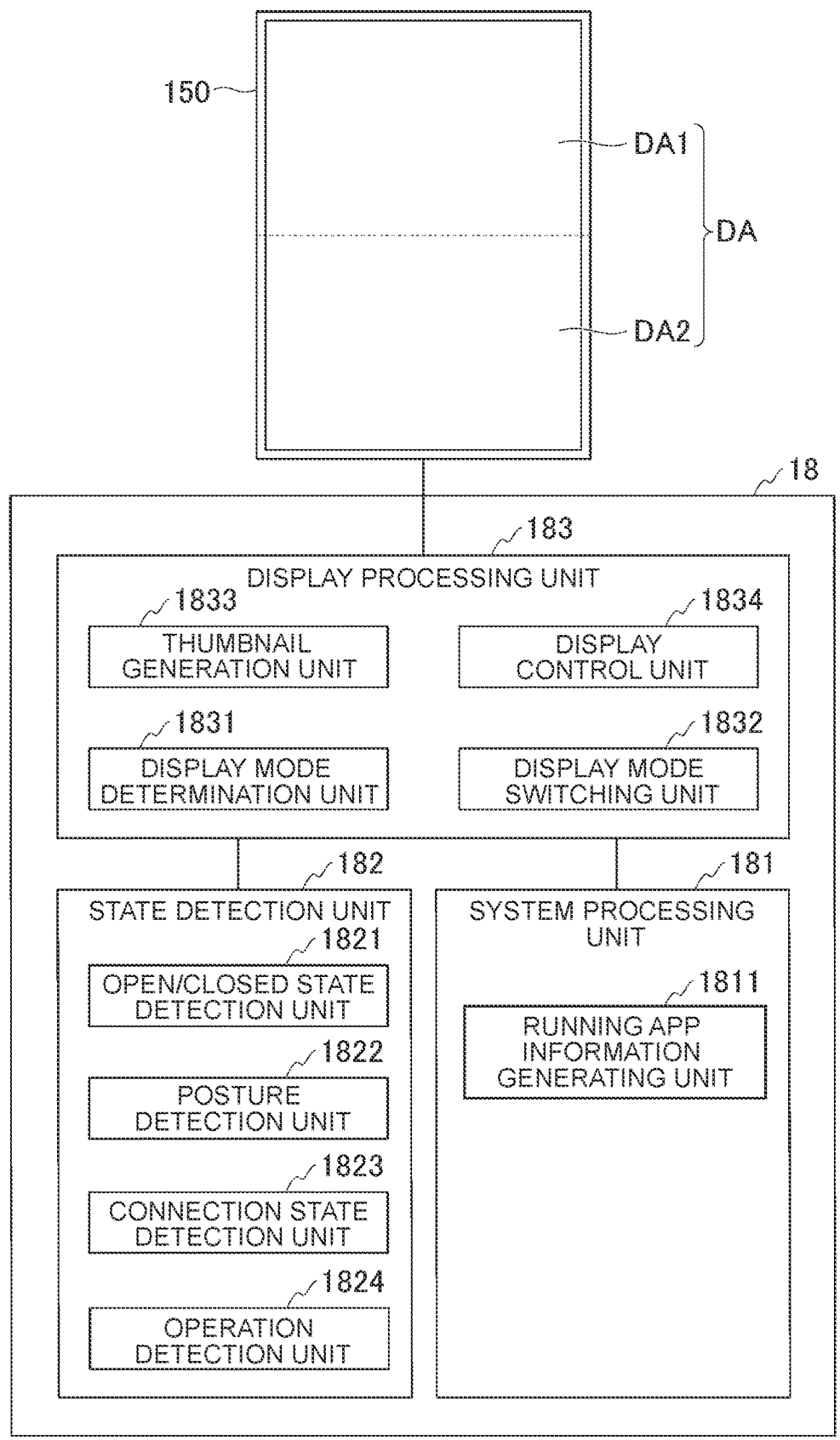
FIG. 7 is a block diagram illustrating a functional configuration example related to display control processing according to the first embodiment.

FIG. 7 is a block diagram illustrating an example of a functional configuration related to the display control processing according to the present embodiment. The illustrated control unit 18 includes functional components implemented by executing a program. The control unit 18 includes a system processing unit 181, a state detection unit 182, and a display processing unit 183. Here, the system processing unit 181 is a functional component the processing of which is executed by the CPU based, for example, on the OS. Further, the state detection unit 182 is a functional component the processing of which is executed by the microcomputer regardless, for example, of the presence or absence of the execution of OS processing. The display processing unit 183 is a functional component the processing of which is executed by the CPU based, for example, on a program running on the OS.

The system processing unit 181 boots the OS and executes an app program running on the OS. Further, the system processing unit 181 has a running app information generating unit 1811 which generates app information such as information indicative of running apps (for example, information including app IDs), and information indicative of an app being used by the user among running apps (i.e., an app the window of which is active). The system processing unit 181 outputs, to the display processing unit 183, the app information generated by the running app information generating unit 1811.

The state detection unit 182 detects the state of the information processing device 10. For example, as functional components for detecting the state of the information processing device 10, the state detection unit 182 has an open/closed state detection unit 1821, a posture detection unit 1822, and a connection state detection unit 1823. The open/closed state detection unit 1821 detects whether the information processing device 10 is in the open state or the closed state based on the detection result of the Hall sensor 17. When the information processing device 10 is in the open state, the open/closed state detection unit 1821 detects the open angle θ between the first chassis 101 and the second chassis 102 based on the detection results of the first acceleration sensor 161 and the second acceleration sensor 162. Then, based on the detected open angle θ, the open/closed state detection unit 1821 detects whether the first chassis 101 and the second chassis 102 are in the bent state (Bent form) or the flat state (Flat form) in which the first chassis 101 and the second chassis 102 are not bent. The posture detection unit 1822 detects the posture (orientation) of the information processing device 10 based on the detection results of the first acceleration sensor 161 and the second acceleration sensor 162. The state detection unit 182 outputs the detection results to the display processing unit 183. The connection state detection unit 1823 detects the connection with the external keyboard (mini-KBD). For example, as described above, the connection state detection unit 1823 uses the Hall sensor (not illustrated) to detect the connection with the external keyboard (mini-KBD) as described above to detect the connection with the external keyboard (mini-KBD).

The state detection unit 182 further has an operation detection unit 1824 as a functional component to detect an operation to the information processing device 10. The operation detection unit 1824 detects a user's operation based on the operation information output from the touch sensor 155 provided on the screen of the display unit 150. For example, the operation detection unit 1824 acquires operation information based on a user's operation on the dialog screen on which switching between the two-screen mode and the one-screen mode can be set, and detects a screen mode switching operation based on the acquired operation information.

The display processing unit 183 determines a display mode and switches between the display modes based on the open/closed state and posture (orientation) of the information processing device 10 acquired from the state detection unit 182. Further, based on the app information acquired from the system processing unit 181, the display processing unit 183 controls the display of the windows of running apps (the active window and inactive windows) according to the display mode. Specifically, the display processing unit 183 has a display mode determination unit 1831, a display mode switching unit 1832, a thumbnail generation unit 1833, and a display control unit 1834.

The display mode determination unit 1831 determines the display mode based on the state of the information processing device 10 detected by the state detection unit 182 or the detection result of a user's operation. For example, the display mode determination unit 1831 acquires, from the state detection unit 182, the detection result of the open/closed state of the information processing device 10, the detection result of whether the first chassis 101 and the second chassis 102 are in the bent state (Bent form) or the flat state (Flat form) in which the first chassis 101 and the second chassis 102 are not bent in the case of the open state, and the detection result of the posture (orientation) of the information processing device 10, and the user's operation information. Then, based on the respective detection results and the operation information acquired from the state detection unit 182, the display mode determination unit 1831 determines the display mode as described with reference to FIG. 5.

The display mode switching unit 1832 controls the display of the display unit 150 based on the display mode determined by the display mode determination unit 1831. Specifically, based on the display mode determined by the display mode determination unit 1831, the display control unit 1834 controls switching between the one-screen mode and the two-screen mode, the orientation of each display area, the display content of each display area, and the like.

Here, the operation of display control processing executed by the control unit 18 will be described.

Figure 8:
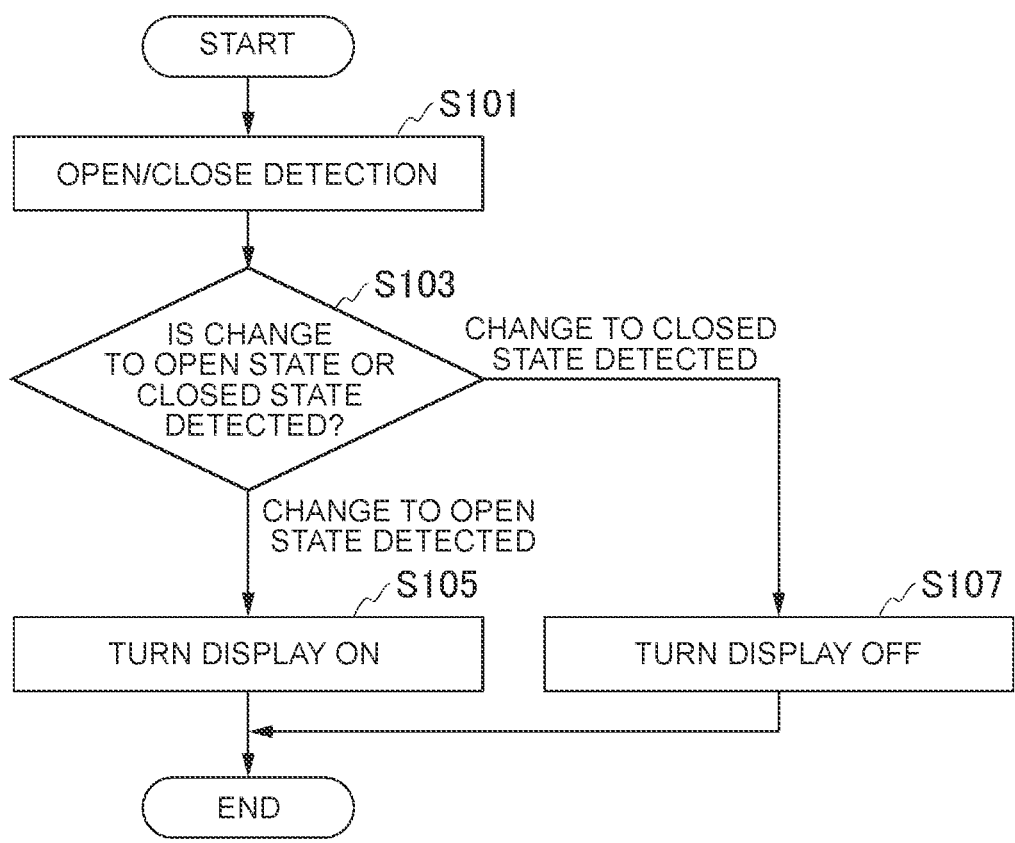
FIG. 8 is a flowchart illustrating an example of display control processing based on open/close detection according to the first embodiment.

FIG. 8 is a flowchart illustrating an example of display control processing based on the open/close detection according to the present embodiment.

(Step S101) The control unit 18 detects whether the information processing device 10 is in the open state or the closed state based on the detection result of the Hall sensor 17. Then, the control unit 18 proceeds to processing in step S103.

(Step S103) Based on the detection result of step S101, the control unit 18 determines whether a change in the information processing device 10 from the closed state to the open state or from the open state to the closed state is detected. When determining the detection of the change from the closed state to the open state, the control unit 18 proceeds to processing in step S105. On the other hand, when determining the detection of the change from the open state to the closed state, the control unit 18 proceeds to processing in step S107.

(Step S105) When the detection of the change from the closed state to the open state is determined, the control unit 18 controls the display of the display unit 150 to be turned on.

(Step S107) When the detection of the change from the open state to the closed state is determined, the control unit 18 controls the display of the display unit 150 to be turned off.

Note that this display control processing is executed, for example, repeatedly at predetermined intervals. In a state where the display is controlled to be on, screen mode switching processing for switching between the one-screen mode and the two-screen mode to be described below is executed.

Next, the operation of screen mode switching processing executed by the control unit 18 will be described.

Figure 9:
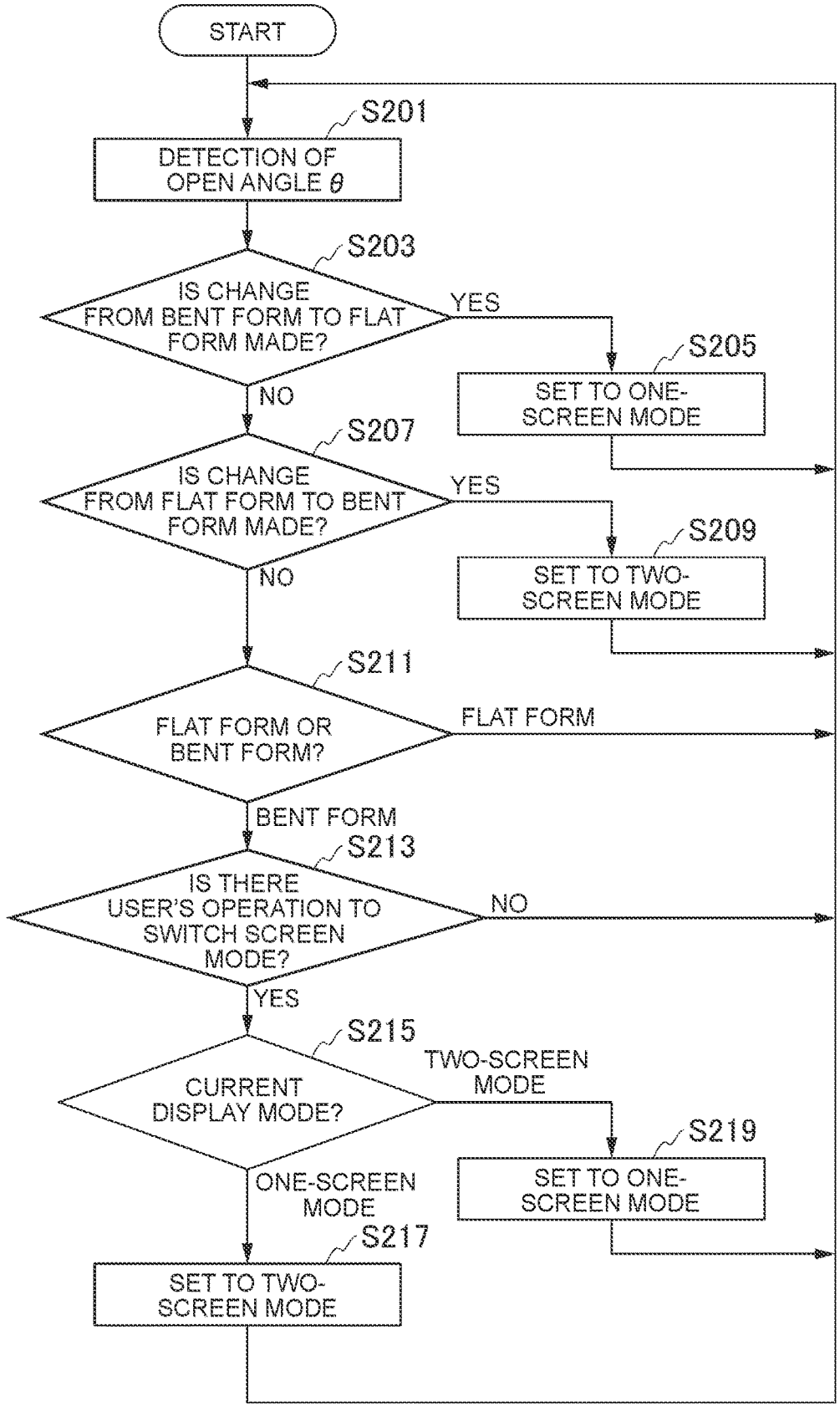
FIG. 9 is a flowchart illustrating an example of screen mode switching processing according to the first embodiment.

FIG. 9 is a flowchart illustrating an example of screen mode switching processing according to the present embodiment. Here, the screen mode switching processing will be described as processing after the control unit 18 detects a change from the closed state to the open state in the display control processing based on the open/close detection illustrated in FIG. 8 to control the display to be turned on.

(Step S201) The control unit 18 detects the open angle $\theta$ between the first chassis 101 and the second chassis 102 based on the detection results of the first acceleration sensor 161 and the second acceleration sensor 162. Then, the control unit 18 proceeds to processing in step S203.

(Step S203) Based on the open angle $\theta$ detected in step S201, the control unit 18 determines whether a change from the bent state (Bent form) where the first chassis 101 and the second chassis 102 are bent to the flat state (Flat form) is made or not. When determining that the change from the bent state (Bent form) to the flat state (Flat form) is made (YES), the control unit 18 proceeds to processing in step S205. On the other hand, when determining that the change from the bent state (Bent form) to the flat state (Flat form) is not made (NO), the control unit 18 proceeds to processing in step S207.

(step S205) When determining in step S203 that the change from the bent state (Bent form) to the flat state (Flat form) is made, the control unit 18 sets the screen mode to the one-screen mode. When the setting of the display mode immediately before the above determination is the two-screen mode, the control unit 18 switches from the two-screen mode to the one-screen mode. On the other hand, when the setting of the display mode immediately before the above determination is the one-screen mode, the control unit 18 continues the setting of the one-screen mode. Note that the control unit 18 controls the display mode to the display mode (d') or the display mode (e') illustrated in FIG. 5 based on the posture (orientation) of the information processing device 10 detected based on the detection results of the first acceleration sensor 161 and the second acceleration sensor 162. Then, the control unit 18 returns to the processing in step S201.

(Step S207) Based on the open angle $\theta$ detected in step S201, the control unit 18 determines whether a change from the flat state (Flat form) where the first chassis 101 and the second chassis 102 are not bent to the bent state (Bent form) is made or not. When determining that the change from the flat state (Flat form) to the bent state (Bent form) is made (YES), the control unit 18 proceeds to processing in step S209. On the other hand, when determining that the change from the flat state (Flat form) to the bent state (Bent form) is not made (NO), the control unit 18 proceeds to processing in step S211.

(Step S209) When determining in step S207 that the change from the flat state (Flat form) to the bent state (Bent form) is made, the control unit 18 sets the screen mode to the two-screen mode. When the setting of the screen mode immediately before the above determination is the two-screen mode, the control unit 18 continues the setting of the two-screen mode. On the other hand, when the setting of the screen mode immediately before the above determination is the one-screen mode, the control unit 18 switches from the one-screen mode to the two-screen mode. Note that the control unit 18 controls the display mode to the display mode (b) or the display mode (c-1) illustrated in FIG. 5 based on the posture (orientation) of the information processing device 10 detected based on the detection results of the first acceleration sensor 161 and the second acceleration sensor 162. Then, the control unit 18 returns to the processing in step S201.

(Step S211) Based on the open angle θ detected in step S201, the control unit 18 determines whether the state is the flat state (Flat form) where the first chassis 101 and the second chassis 102 are not bent or the bent state (Bent form). When determining the flat state (Flat form), the control unit 18 returns to the processing in step S201. On the other hand, when determining the bent state (Bent form), the control unit 18 proceeds to processing in step S213.

(Step S213) Based on the operation information output from the touch sensor 155, the control unit 18 determines whether there is a user's operation to switch the screen mode or not. When determining that there is no user's operation to switch the screen mode (NO), the control unit 18 returns to the processing in step 201. On the other hand, when determining that there is the user's operation to switch the screen mode (YES), the control unit 18 proceeds to processing in step 215.

(Step S215) The control unit 18 determines whether the current screen mode is the one-screen mode or the two-screen mode. When determining that the current screen mode is the one-screen mode, the control unit 18 proceeds to processing in step S217. On the other hand, when determining that the current screen mode is the two-screen mode, the control unit 18 proceeds to processing in step S219.

(Step S217) When determining that the current screen mode is the one-screen mode, the control unit 18 sets the screen mode to the two-screen mode to switch from the one-screen mode to the two-screen mode. Note that the control unit 18 controls the display mode to the display mode (b) or the display mode (c-1) illustrated in FIG. 5 based on the posture (orientation) of the information processing device 10 detected based on the detection results of the first acceleration sensor 161 and the second acceleration sensor 162. Then, the control unit 18 returns to the processing in step S201.

(Step S219) When determining that the current screen mode is the two-screen mode, the control unit 18 sets the screen mode to the one-screen mode to switch from the two-screen mode to the one-screen mode. Note that the control unit 18 controls the display mode to the display mode (d) or the display mode (e) illustrated in FIG. 5 based on the posture (orientation) of the information processing device 10 detected based on the detection results of the first acceleration sensor 161 and the second acceleration sensor 162. Then, the control unit 18 returns to the processing in step S201.

Returning to FIG. 7, the thumbnail generation unit 1833 generates a thumbnail image(s) corresponding to an inactive window(s) among windows of running apps. The thumbnail image(s) is displayed in the second display area DA2 in the case of the thumbnail window display.

In response to switching from the one-screen mode to the two-screen mode by the display mode switching unit 1832, the display control unit 1834 displays, in the first display area DA1, an active window among the windows of running apps, and displays, in the second display area DA2, the thumbnail image(s) generated by the thumbnail generation unit 1833 (see FIG. 2). The active window displayed in the first display area DA1 is a window being displayed as the active window (foreground window) in the one-screen mode immediately before the transition to the two-screen mode.

Note that the display control unit 1834 may full-screen display the active window when displaying the active window in the first display area DA1 in response to switching to the two-screen mode regardless of whether the active window is full-screen displayed or not in the one-screen mode immediately before the transition to the two-screen mode.

Further, the thumbnail image displayed in the second display area DA2 is a thumbnail image corresponding to an inactive window in the one-screen mode immediately before the transition to the two-screen mode. When there are two or more inactive windows, the display control unit 1834 displays thumbnail images, respectively corresponding to the two or more inactive windows, side by side in the second display area DA2 (see FIG. 2). For example, the display control unit 1834 displays, in the second display area DA2, a thumbnail window containing one or more thumbnail images. For example, the display control unit 1834 may display, the thumbnail image(s) in the second display area DA2 in a semi-transparent display form. Note that, when there is no inactive window in the one-screen mode immediately before the transition to the two-screen mode, no thumbnail image corresponding to any inactive window is displayed in the second display area DA2.

Further, when any one of thumbnail images displayed in the second display area DA2 is selected, the display control unit 1834 displays an inactive window corresponding to the selected thumbnail image in the second display area DA2 as an active window. At this time, the display control unit 1834 closes and hides the thumbnail window containing the thumbnail images displayed in the second display area DA2. Note that the display control unit 1834 may full-screen display, in the second display area DA2, the inactive window corresponding to the selected thumbnail image as the active window.

Here, the operation of thumbnail window display control processing executed by the control unit 18 will be described.

Figure 10:
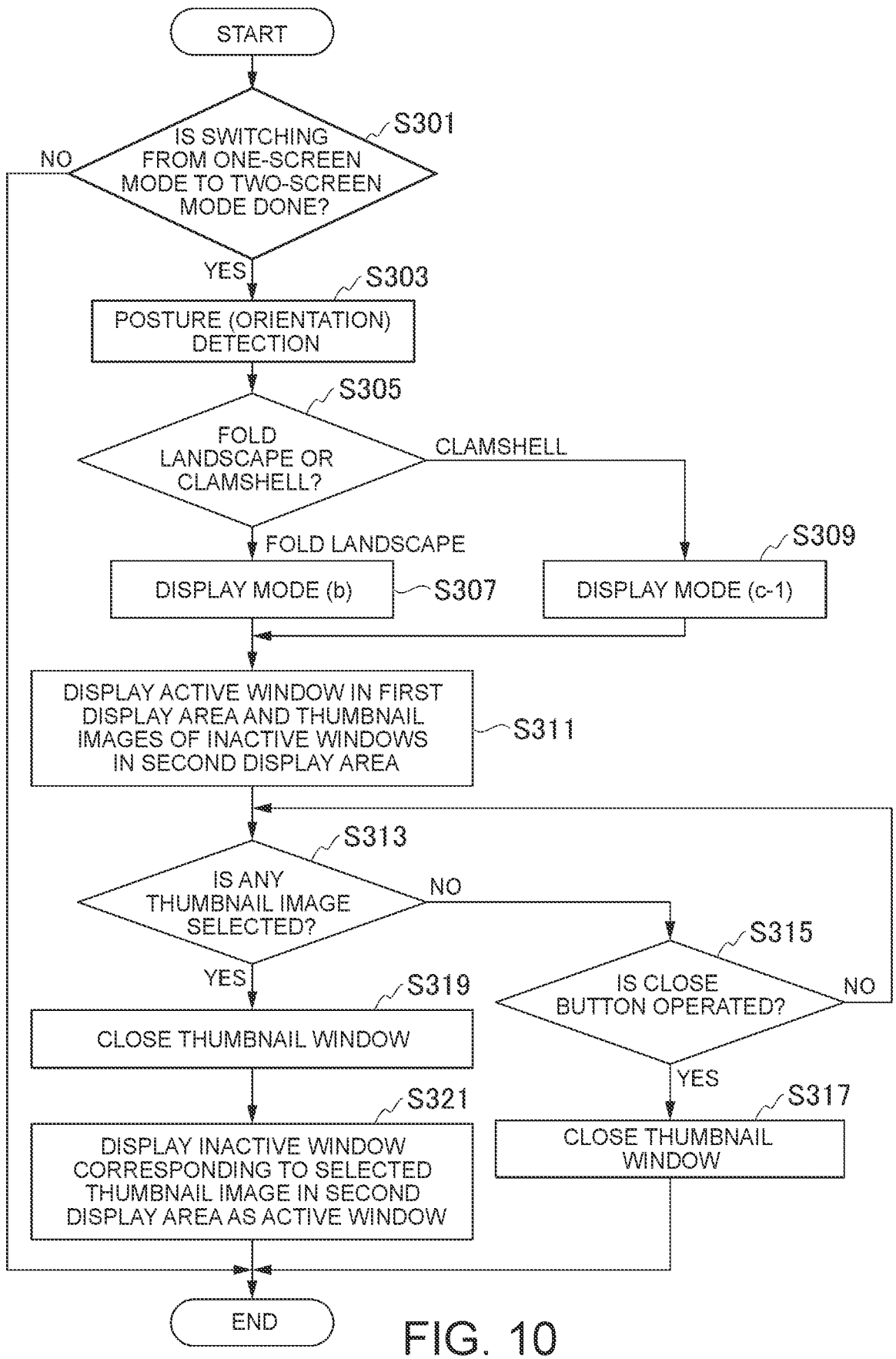
FIG. 10 is a flowchart illustrating an example of thumbnail window display control processing based on open/close detection according to the first embodiment.

FIG. 10 is a flowchart illustrating an example of thumbnail window display control processing based on the open/close detection according to the present embodiment.

(Step S301) The control unit 18 determines whether switching from the one-screen mode to the two-screen mode is done by the display mode switching unit 1832 or not. When determining that switching from the one-screen mode to the two-screen mode is not done (NO), the control unit 18 ends the processing without providing a thumbnail window display. On the other hand, when determining that switching from the one-screen mode to the two-screen mode is done (YES), the control unit 18 proceeds to processing in step S303.

(Step S303) The control unit 18 detects the posture (orientation) of the information processing device 10 based on the detection results of the first acceleration sensor 161 and the second acceleration sensor 162. Then, the control unit 18 proceeds to processing in step 305.

(Step S305) Based on the posture (orientation) of the information processing device 10 detected in step S303, the control unit 18 determines whether the usage form of the information processing device 10 is "Fold Landscape" or "Clamshell." When determining "Fold Landscape," the control unit 18 proceeds to processing in step S307. On the other hand, when determining "Clamshell," the control unit 18 proceeds to processing in step S309.

(Step S307) When determining "Fold Landscape," the control unit 18 controls the display mode to the display mode (b) (see FIG. 5). Then, the control unit 18 proceeds to processing in step 311.

(Step S309) When determining "Clamshell," the control unit 18 controls the display mode to the display mode (c-1) (see FIG. 5). Then, the control unit 18 proceeds to processing in step 311.

(Step S311) The control unit 18 displays (for example, full-screen displays), in the first display area DA1, an active window among windows of apps running in the one-screen mode immediately before switching to the two-screen mode. Further, the control unit 18 displays, in the second display area DA2, thumbnail images (thumbnail window) corresponding to inactive windows among windows of apps running in the one-screen mode immediately before switching to the two-screen mode. On this occasion, the control unit 18 controls the orientation of each display of the first display area DA1 and the second display area DA2 according to the orientation of the display in each display mode.

(Step S313) The control unit 18 determines whether any one of the thumbnail images displayed in the second display area DA2 is selected or not. When determining that no thumbnail image is selected (NO), the control unit 18 proceeds to processing in step S315. On the other hand, when determining that any one of the thumbnail images is selected (YES), the control unit 18 proceeds to processing in step S319.

(Step S315) The control unit 18 determines whether the close button displayed on the title bar of the thumbnail window displayed in the second display area DA2 is operated or not. When determining that the close button is operated (YES), the control unit 18 proceeds to processing in step S317. On the other hand, when determining that the close button is not operated (NO), the control unit 18 returns to the processing in step S313.

(Step S317) When determining in step S315 that the close button is operated, the control unit 18 closes the thumbnail window and ends the thumbnail window display control processing.

(Step S319) When determining in S313 that any one of the thumbnail images is selected, the control unit 18 closes the thumbnail window, and proceeds to processing in step S321.

(Step S321) The control unit 18 displays, (for example, full-screen displays) an inactive window corresponding to the selected thumbnail image in the second display area DA2 as an active window.

As described above, the information processing device 10 according to the present embodiment can control display in two or more display areas which do not overlap each other and include at least the first display area DA1 and the second display area DA2. In the case of the display mode (c-1), the information processing device 10 displays, in the first display area DA1, an active window among windows of running apps, and displays, in the second display area DA2, thumbnail images corresponding to inactive windows other than the active window. Here, the display mode (c-1) is a display mode in a clamshell usage form in which the first display area DA1 and the second display area DA2 are so arranged that an edge on the lower side of the first display area DA1 in the orientation of the display thereof comes to an edge on the upper side of the second display area DA2 in the orientation of the display thereof. For example, the first display area DA1 is the primary screen and the second display area DA2 is the secondary screen.

In the usage form of the clamshell two-screen mode, since the information processing device 10 can not only display an active window on the primary screen, but also can display windows other than the active window on the secondary screen in a list of thumbnail images, other running apps can be checked easily and this is convenient to use. Thus, the information processing device 10 can make more effective use of the two or more display areas.

For example, the information processing device 10 switches between the one-screen mode (an example of a first display mode), in which the display is controlled as one display area obtained by combining the two or more display areas, and the two-screen mode (an example of a second display mode) in which the display is controlled as two display areas of at least the first display area DA1 and the second display area DA2. Here, such a mode that the display is controlled as one display area obtained by combining the two or more display areas can be rephrased that the display is controlled as one display area in which the two or more display areas are connected, that is, the one-screen mode is such a mode that the display is controlled in a one-screen structure in which the whole of two or more display areas is set as one screen. On the other hand, such a mode that the display is controlled as two display areas of at least the first display area DA1 and the second display area DA2 can be rephrased that the display is controlled as two or more display areas in which the display is split into at least the first display area DA1 and the second display area DA2, that is, the two-screen mode is such a mode that the display is controlled in a two-screen structure in which the display is split into two display areas of at least the first display area DA1 and the second display area DA2 which do not overlap each other. Then, in response to switching from the one-screen mode to the two-screen mode, the information processing device 10 displays the active window in the one-screen mode in the first display area DA1, and displays, in the second display area DA2, the thumbnail images corresponding to the inactive windows in the one-screen mode.

Upon the transition from the one-screen mode to the two-screen mode, the information processing device 10 can not only use the running app displayed in the active window continuously on the primary screen, but also can check other running apps easily on the secondary screen, so it is convenient to use. Thus, the information processing device 10 can make more effective use of the two or more display areas.

For example, when there are two or more inactive windows, the information processing device 10 displays thumbnail images respectively corresponding to the two or more inactive windows side by side in the second display area DA2.

Thus, in the usage form of the clamshell two-screen mode, since the information processing device 10 can not only display an active window on the primary screen, but also can display two or more windows other than the active window on the secondary screen in a list of thumbnail images, other running apps can be checked easily and this is convenient to use.

Further, when any one of the thumbnail images displayed in the second display area DA2 is selected, the information processing device 10 displays an inactive window corresponding to the selected thumbnail image in the second display area DA2 as an active window.

Thus, the information processing device 10 can easily make an app in the inactive window available on the secondary screen side merely by selecting a thumbnail image on the secondary screen side.

Further, when any one of the thumbnail images displayed in the second display area DA2 is selected, the information processing device 10 hides the thumbnail images. Thus, the information processing device 10 can hide the thumbnail images of apps not in use to make it easy to use an app to be operated.

For example, the information processing device 10 may display (full-screen display) an inactive window corresponding to the selected thumbnail image in the whole of the second display area DA2 as an active window. Thus, the information processing device 10 can full-screen display the app to make it easy to use the app.

Note that, when displaying the inactive window corresponding to the selected thumbnail image in the second display area DA2 as the active window, the information processing device 10 may also provide a display in a display area smaller than the whole display area, rather than providing the full-screen display. In this case, the information processing device 10 may provide a display in the center of the second display area DA2, or provide a display on the left side, right side, upper side, or lower side of the second display area DA2.

Further, the example in which the information processing device 10 displays (full-screen displays) the active window in the whole of the first display area DA1 when displaying the active window in the first display area DA1 is described, but the information processing device 10 may also provide a display in a display area smaller than the whole display area, rather than providing the full-screen display. In this case, the information processing device 10 may provide a display in the center of the first display area DA1, or provide a display on the left side, right side, upper side, or lower side of the first display area DA1.

Further, the information processing device 10 may display the thumbnail images in a semi-transparent display form.

In this case, since the information processing device 10 makes icons and the like displayed in the background of the thumbnail images checkable on the secondary screen, a user who does not need to use apps in inactive windows can also visually confirm information other than the thumbnail images, and this is convenient to use.

Further, the information processing device 10 includes the first chassis 101 corresponding to the first display area DA1, the second chassis 102 corresponding to the second display area DA2, and the hinge mechanism 103 (an example of a hinge unit) which connects the first chassis 101 and the second chassis 102 to be rotatable relative to each other. The information processing device 10 detects whether the first chassis 101 and the second chassis 102 are in the bent state (Bent form) by the relative rotation of the first chassis 101 and the second chassis 102 or not. Then, when detecting a change from the flat state (Flat form) in which the first chassis 101 and the second chassis 102 are not bent to the bent state (Bent form), the information processing device 10 switches from the one-screen mode to the two-screen mode.

Thus, the information processing device 10 switches from the one-screen mode to the two-screen mode automatically merely by bending the first chassis 101 and the second chassis 102 from the flat state (Flat form) in which the first chassis 101 and the second chassis 102 are not bent, so it is convenient to use.

The information processing device 10 may also switch between the one-screen mode and the two-screen mode based on a user's operation.

In this case, the information processing device 10 allows the user to switch between the one-screen mode and the two-screen mode arbitrarily, so it is convenient to use.

Second Embodiment

Next, a second embodiment of the present invention will be described.

In the first embodiment, the display area of one display unit 150 (flexible display 151) of the information processing device 10 is split into two display areas of the first display area DA1 and the second display area DA2 to configure the two-screen mode, but the present invention is not limited thereto. For example, the information processing device 10 may also have such a structure as to include two display units (two displays).

Figure 11:
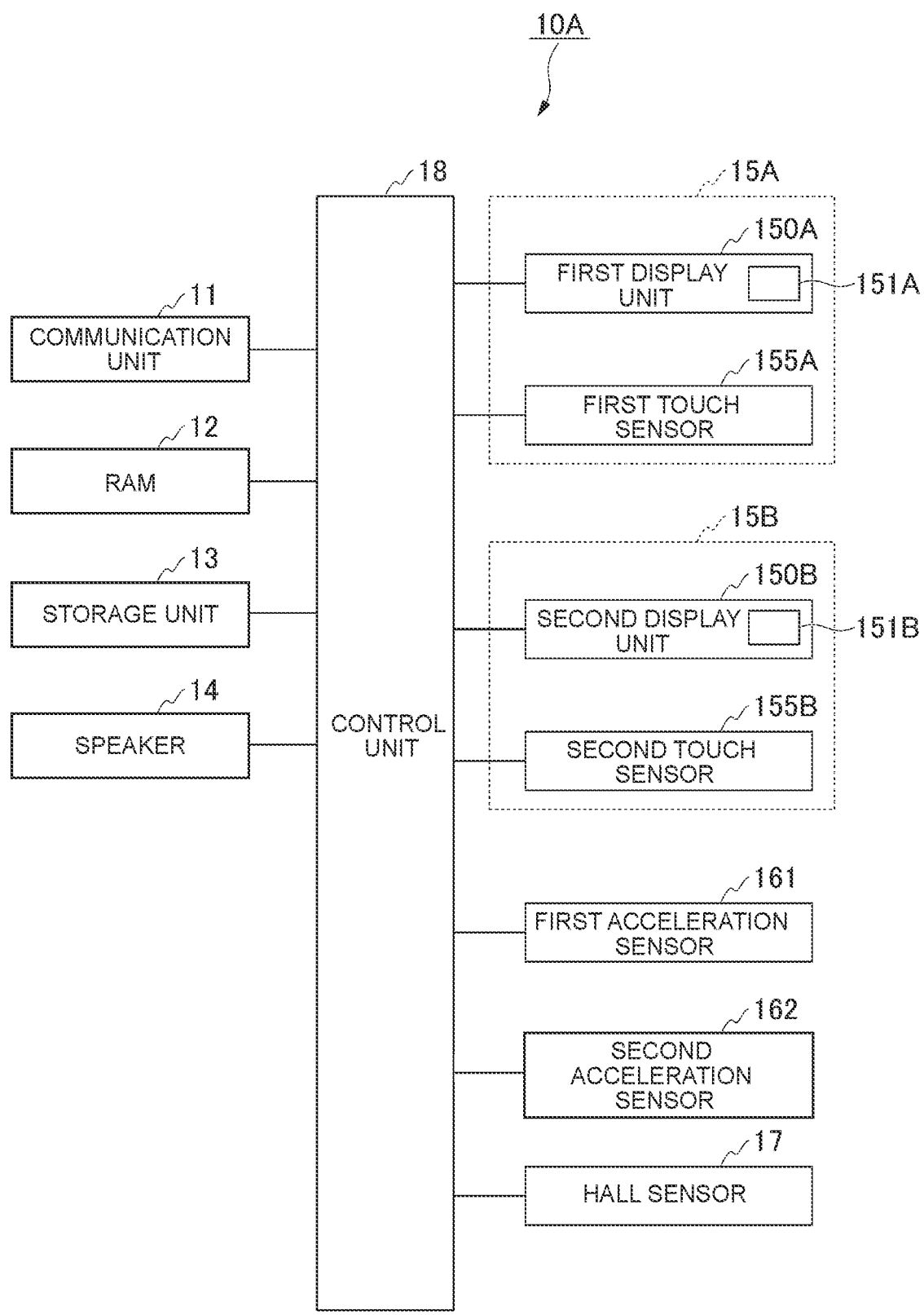
FIG. 11 is a block diagram illustrating a hardware configuration example of an information processing device according to a second embodiment.

FIG. 11 is a block diagram illustrating an example of the hardware configuration of an information processing device 10A according to this embodiment. The illustrated information processing device 10A includes the communication unit 11, the RAM (Random Access Memory) 12, the storage unit 13, the speaker 14, a first touch screen 15A, a second touch screen 15B, the first acceleration sensor 161, the second acceleration sensor 162, the Hall sensor 17, and the control unit 18. These units are connected communicably to one another through a bus or the like. The first touch screen 15A includes a first display unit 150A having a first display 151A and a first touch sensor 155A. The second touch screen 15B includes a second display unit 150B having a second display 151B and a second touch sensor 155B. In other words, the hardware configuration of the information processing device 10A is different from the hardware configuration of the information processing device 10 illustrated in FIG. 6 mainly in that two display units of the first display unit 150A having the first display 151A and the second display unit 150B having the second display 151B are included.

Figure 12:
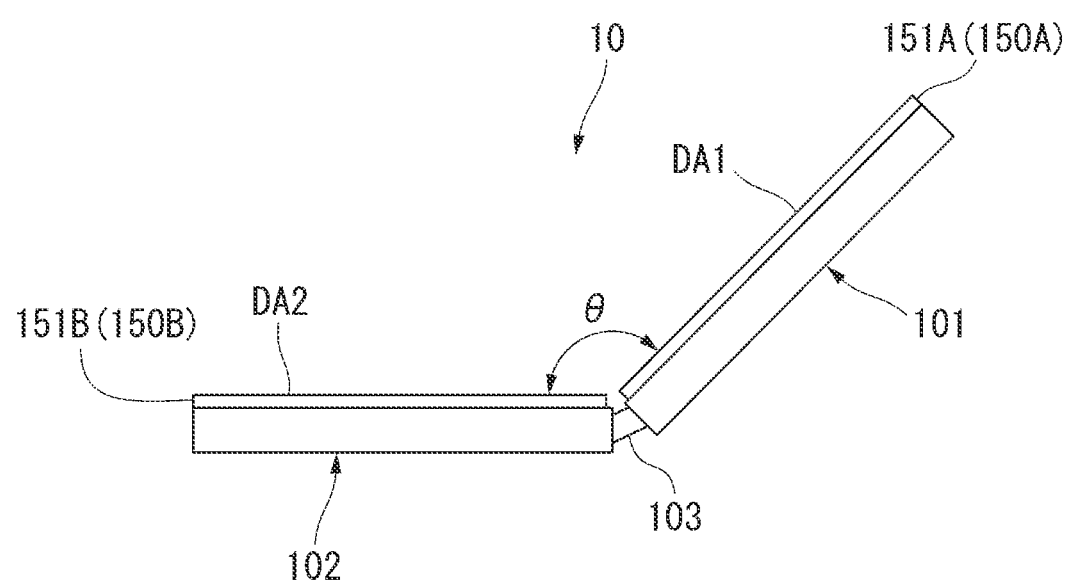
FIG. 12 is a side view illustrating an example of the information processing device according to the second embodiment.

FIG. 12 is a side view illustrating an example of the information processing device 10A according to the present embodiment. FIG. 12 is a figure corresponding to FIG. 3 illustrating the side view of the information processing device 10 according to the first embodiment. The first display 151A of the first display unit 150A is placed on the inner surface of the first chassis 101. Further, the second display 151B of the second display unit 150B is placed on the inner surface of the second chassis 102. The display area of the first display unit 150A (first display 151A) corresponds to the first display area DA1, and the display area of the second display unit 150B (second display 151B) corresponds to the second display area DA2.

Figure 13:
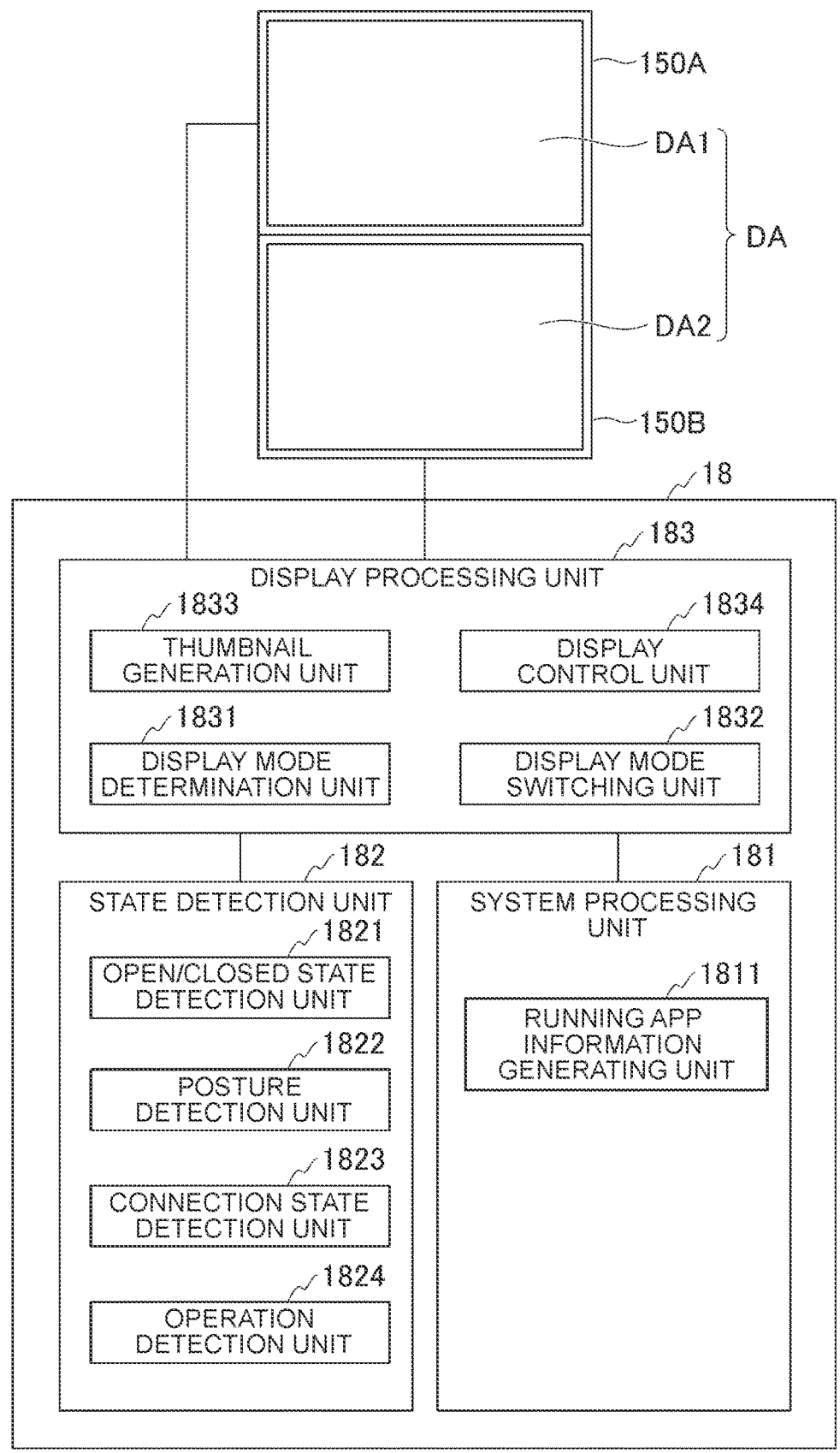
FIG. 13 is a block diagram illustrating a functional configuration example related to display control processing according to the second embodiment.

FIG. 13 is a block diagram illustrating an example of the functional configuration related to display control processing according to the present embodiment. Like in the configuration illustrated in FIG. 7, the illustrated control unit 18 includes the system processing unit 181, the state detection unit 182, and the display processing unit 183. In the present embodiment, the first display area DA1 of the first display unit 150A and the second display area DA2 of the second display unit 150B are two display areas in the two-screen mode. Further, in the one-screen mode, the first display area DA1 of the first display unit 150A and the second display area DA2 of the second display unit 150B can be combined as one display area DA. The display processing unit 183 controls the display of the first display unit 150A and the second display unit 150B to execute thumbnail window display control processing as described in the first embodiment.

Note that the configuration example illustrated in FIG. 11 to FIG. 13 is such that the information processing device 10A includes the two display units, but one of the two display units may also be set as an external display device (external monitor).

While the embodiments of this invention have been described in detail with reference to the accompanying drawings, the specific configurations are not limited to those described above, and various design changes and the like can be made without departing from the scope of this invention. For example, the configurations described in the above respective embodiments may be combined with each other arbitrarily.

Further, in the above-described embodiments, the examples of the display mode (c-1) in which the first display area DA1 and the second display area DA2 are lined up in the up and down direction are illustrated and mainly described. However, even in the case of the display mode (b) in which the first display area DA1 and the second display area DA2 are lined up side by side, the above-described thumbnail window display control processing can be applied in the same manner. In other words, the alignment and orientation of the first display area DA1 and the second display area DA2 are not limited at all.

Further, in the specific examples of the various display modes of the information processing device 10 illustrated in FIG. 5, only the example of the one-screen mode is described in the flat state (Flat form) in which the first chassis 101 and the second chassis 102 are not bent (i.e., in the case of the so-called tablet mode). However, the present invention is not limited thereto, and the information processing device 10 may also be able to switch between the one-screen mode and the two-screen mode even in the flat state (Flat form). For example, when detecting an operation on the screen mode switching icon in the state of the display mode (d') or the display mode (e'), the information processing device 10 may switch from the one-screen mode to the two-screen mode. Specifically, when switching from the display mode (d') to the two-screen mode, the information processing device 10 may control the first display area DA1 and the second display area DA2 to be lined up side by side in portrait orientation like in the display mode (b) to execute the thumbnail window display control processing. Further, when switching from the display mode (e') to the two-screen mode, the information processing device 10 may control the first display area DA1 and the second display area DA2 to be lined up and down in landscape orientation like in the display mode (c-1) to execute the thumbnail window display control processing. In the case of processing to make it switchable between the one-screen mode and the two-screen mode with a user's operation regardless of whether the first chassis 101 and the second chassis 102 is in the bent state (Bent form) or in the flat state (Flat form) in which the first chassis 101 and the second chassis 102 are not bent, the processing illustrated in FIG. 9 may be altered in such a manner that step S211 is deleted, and when NO is determined in step S207, the procedure proceeds to processing in step S213.

Further, in the above-described embodiments, the examples of the thumbnail window display control processing for two display areas of the first display area DA1 and the second display area DA2 are described, but the thumbnail window display control processing may also be applied to three or more display areas. For example, this case of thumbnail window display control processing may be such that an active window is displayed in one display area among the tree or more display areas, thumbnail images corresponding to inactive windows are displayed in the remaining two or more display areas, respectively, and an inactive window corresponding to a selected thumbnail image is displayed as an active window in each of the display areas, respectively.

Further, in the above-described embodiments, the examples of touch operations on one or two touch panel displays each of which is composed integrally of an input unit (touch sensor) and a display unit are described, but the operations are not limited to the touch operations, and the operations may also be click operations using a mouse, operations by gesture, and the like.

Note that the above-described control unit 18 has a computer system therein. Then, a program for implementing the function of each component included in the control unit 18 described above may be recorded on a computer-readable recording medium in such a manner that the program recorded on this recording medium is read into the computer system and executed to perform processing in each component included in the control unit 18 described above. Here, the fact that "the program recorded on the recording medium is read into the computer system and executed" includes installing the program on the computer system. It is assumed that the "computer system" here includes the OS and hardware such as a peripheral device and the like. Further, the "computer system" may also include two or more computers connected through any of networks including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

A recording medium internally or externally provided to be accessible from a delivery server for delivering the program is included as the recording medium. Note that the program may be divided into plural pieces, downloaded at different timings, respectively, and then united in each component included in the control unit 18, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the functions of the control unit 18 in the above-described embodiments may be realized as an integrated circuit such as LSI (Large Scale Integration). Each function may be a processor implemented individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, in the above-described embodiments, the example in which the information processing device 10 (10A) is a clamshell PC is described, but the information processing device 10 (10A) may also be a tablet PC or a desktop PC. Further, the information processing device 10 (10A) is not limited to the PC, and it may also be a smartphone, a game console, or the like.

DESCRIPTION OF SYMBOLS

10, 10A: information processing device, 101: first chassis, 102: second chassis, 103: hinge mechanism, 11: communication unit, 12: RAM, 13: storage unit, 14: speaker, 15: touch screen, 15A: first touch screen, 15B: second touch screen, 150: display unit, 150A: first display unit, 150B: second display unit, 155: touch sensor, 155A: first touch sensor, 155B: second touch sensor, 161: first acceleration sensor, 162: second acceleration sensor, 17: Hall sensor, 18: control unit, 181: system processing unit, 1811: running app information generating unit, 182: state detection unit, 1821: open/closed state detection unit, 1822: posture detection unit, 1823: connection state detection unit, 1824: operation detection unit, 183: display processing unit, 1831: display mode determination unit, 1832: display mode switching unit, 1833: thumbnail generation unit, 1834: display control unit.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing device that controls a display in a plurality of display areas, which do not overlap one another and include at least a first display area and a second display area, the information processing device comprising:
   a display mode switching unit that switches between:
      a first display mode, in which the display is controlled as one display area combining the plurality of display areas, and
      a second display mode in which the display is controlled as two display areas of at least the first display area and the second display area; and
   a display control unit that, in response to switching from the first display mode to the second display mode when an active window and an inactive window both exist in the one display area during the first display mode:
      adapts the active window and the inactive window, that exist in the one display area, to be displayed in the first display area,
      displays, in the first display area, the active window,
      places the inactive window behind the active window in the first display area, and
      displays, in the second display area, a thumbnail window including a thumbnail image corresponding to the inactive window,
   a first chassis corresponding to the first display area;
   a second chassis corresponding to the second display area;
   a hinge unit that connects the first chassis and the second chassis such that the first and second chassis are rotatable relative to one another; and
   a state detection unit that detects whether the first chassis and the second chassis are in a bent state by relative rotation between the first chassis and the second chassis,
   wherein when a change from a state where the first chassis and the second chassis are not bent to the bent state is detected, the display mode switching unit switches from the first display mode to the second display mode,
   wherein the thumbnail image is an image of the inactive window immediately before the switching from the first display mode to the second display mode,
   wherein the thumbnail window includes a title bar with a button that cause the thumbnail window to close when activated,
   wherein the thumbnail window is a full-screen display on the second display area of the second chassis such that the title bar delimits an upper edge of the second display area that separates the second display area from the first display area, and
   wherein the thumbnail window does not overlap a taskbar function of the information processing device.

2. The information processing device according to claim 1, further comprising:
   a display screen disposed across the first chassis and the second chassis that is bent according to the relative rotation between the first chassis and the second chassis, wherein
   the display screen has the first display area on a side of the first chassis and the second display area on a side of the second chassis.

3. The information processing device according to claim 1, further comprising:
   a first display screen including the first display area and that is disposed on the first chassis; and
   a second display screen including the second display area and that is disposed on the second chassis.

4. The information processing device according to claim 1, wherein, when there is a plurality of inactive windows, the display control unit respectively displays, side by side, thumbnail images corresponding to each of the plurality of inactive windows in the thumbnail window in the second display area.

5. The information processing device according to claim 4, wherein, when any one of the thumbnail images displayed in the thumbnail window in the second display area is selected, the display control unit:
   closes the thumbnail window; and
   displays an inactive window, from among the plurality of inactive windows, that corresponds to the selected thumbnail image in the second display area as an active window.

6. The information processing device according to claim 5, wherein, when any one of the thumbnail images displayed in the thumbnail window in the second display area is selected, the display control unit hides the thumbnail image by closing the thumbnail window.

7. The information processing device according to claim 5, wherein the display control unit displays the inactive window that corresponds to the selected thumbnail image in an entirety of the second display area as the active window.

8. The information processing device according to claim 1, wherein the display control unit displays the thumbnail image in a semi-transparent display form.

9. A control method for an information processing device that controls a display in a plurality of display areas, which do not overlap one another and include at least a first display area and a second display area, the control method comprising:
   causing a display mode switching unit to switch between:
      a first display mode, in which the display is controlled as one display area combining the plurality of display areas, and
      a second display mode in which the display is controlled as two display areas of at least the first display area and the second display area; and in response to switching from the first display mode to the second display mode when an active window and an inactive window both exist in the one display area during the first display mode, using a display control unit:
  adapting the active window and the inactive window, that exist in the one display area, to be displayed in the first display area,
  displaying, in the first display area, the active window,
  placing the inactive window behind the active window in the first display area, and
  displaying, in the second display area, a thumbnail window including a thumbnail image corresponding to the inactive window,
wherein the information processing device includes:
  a first chassis corresponding to the first display area;
  a second chassis corresponding to the second display area;
  a hinge unit that connects the first chassis and the second chassis such that the first and second chassis are rotatable relative to one another; and
  a state detection unit that detects whether the first chassis and the second chassis are in a bent state by relative rotation between the first chassis and the second chassis,
wherein the control method further comprises:
  causing a state detection unit to detect whether the first chassis and the second chassis are in a bent state by relative rotation between the first chassis and the second chassis, wherein
  when a change from a state where the first chassis and the second chassis are not bent to the bent state is detected, switching, using the display mode switching unit, the first display mode to the second display mode,
wherein the thumbnail image is an image of the inactive window immediately before the switching from the first display mode to the second display mode,
wherein the thumbnail window includes a title bar with a button that cause the thumbnail window to close when activated,
wherein the thumbnail window is a full-screen display on the second display area of the second chassis such that the title bar delimits an upper edge of the second display area that separates the second display area from the first display area, and
wherein the thumbnail window does not overlap a taskbar function of the information processing device.

* * * * *